(12) United States Patent
Minelli et al.

(10) Patent No.: US 10,476,584 B1
(45) Date of Patent: Nov. 12, 2019

(54) SYSTEMS AND METHODS FOR AUTONOMOUS OPERATIONS OF GROUND STATION NETWORKS

(71) Applicant: The United States of America, as represented by the Secretary of the Navy, Arlington, VA (US)

(72) Inventors: Giovanni Minelli, Monterey, CA (US); Mark Karpenko, Salinas, CA (US); Issac Michael Ross, Monterey, CA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/827,832

(22) Filed: Nov. 30, 2017

Related U.S. Application Data

(60) Provisional application No. 62/588,699, filed on Jul. 5, 2017.

(51) Int. Cl.
*H04B 7/185* (2006.01)
*H04B 7/204* (2006.01)
(Continued)

(52) U.S. Cl.
CPC ............ *H04B 7/18519* (2013.01); *G01S 5/06* (2013.01); *G06F 17/10* (2013.01);
(Continued)

(58) Field of Classification Search
CPC .. H04B 7/18517; H04B 7/18; H04B 7/18519; H04B 7/204; G01S 5/06; G06F 17/10
See application file for complete search history.

(56) References Cited

U.S. PATENT DOCUMENTS

| | | |
|---|---|---|
| 5,537,679 A | 7/1996 | Crosbie et al. |
| 5,590,395 A | 12/1996 | Diekelman |

(Continued)

OTHER PUBLICATIONS

Greenslade, "An optimal control problem approach to mission planning problems: a proof of concept," (MS thesis, Naval Postgraduate School, 2014), available at https://calhoun.nps.edu/handle/10945/49611 last accessed Sep. 15, 2017.

(Continued)

*Primary Examiner* — George Eng
*Assistant Examiner* — Hung K Du
(74) *Attorney, Agent, or Firm* — Naval Postgraduate School; Scott Bell

(57) ABSTRACT

A mission planning system for scheduling the operations of one or more ground stations in order to optimize overall system communications with a plurality of satellites. The mission planning system comprises a digital processor in communication with each ground station, with the digital processor acting to assess the benefits and penalties acting in the system as a whole over a given time horizon. A system-wide cost function evaluated by the processor generally compares resultant SNR and slewing penalties for achievable communications, and provides a control vector $u_j(t)$ for each ground station determined through an optimization process, in order that various physical constraints and weighting factors pertinent to an individual ground station may be incorporated and accommodated as the digital processor optimizes overall system communications.

17 Claims, 21 Drawing Sheets

(51) Int. Cl.
*H04B 17/18* (2015.01)
*G01S 5/06* (2006.01)
*G06F 17/10* (2006.01)

(52) U.S. Cl.
CPC ......... *H04B 7/18517* (2013.01); *H04B 7/204* (2013.01); *H04B 17/18* (2015.01)

(56) References Cited

U.S. PATENT DOCUMENTS

| | | | |
|---|---|---|---|
| 5,659,298 A | 8/1997 | Brooks et al. | |
| 5,966,640 A | 10/1999 | Leath et al. | |
| 5,978,363 A * | 11/1999 | Dimitrijevic | H04B 7/18539 370/319 |
| 7,236,738 B2 | 6/2007 | Settle | |
| 2017/0019800 A1* | 1/2017 | Liu | H04W 16/28 |

OTHER PUBLICATIONS

Hurni, "An information-centric approach to autonomous trajectory planning utilizing optimal control techniques," (PhD dissertation, Naval Postgraduate School, 2009), available at https://calhoun.nps.edu/handle/10945/10469 last accessed Sep. 15, 2017.

Lewis et al., "A pseudospectral method for real-time motion planning and obstacle avoidance," AVT-SCI Joint Symposium on Platform Innovations and System Integration for Unmanned Air, Land and Sea Vehicles, Florence, Italy, May 14-17, 2007.

Lewis et al., "Pseudospectral motion planning techniques for autonomous obstacle avoidance," Proceedings of the 46th IEEE Conference on Decision and Control, New Orleans, LA, Dec. 12-14, 2007.

Ross et al., "Pseudospectral Methods for Optimal Motion Planning of Differentially Flat Systems," IEEE Transactions on Automatic Control 49(8) (2004).

Ross et al., "Issues in the real-time computation of optimal control," Mathematical and Computer Modelling 43 (2006).

Ross et al., "A Unified Computational Framework for Real-Time Optimal Control," Proceedings of the 42nd IEEE Conference on Decision and Control (2003).

Ross et al., "A Review of Pseudospectral Optimal Control: From Theory to Flight," Annual Reviews in Control 36 (2012).

\* cited by examiner

*Minimize*

$$J[x(\cdot), u(\cdot), t_f] = \int_{t_0}^{t_f} \sum_{i=0}^{n_{SAT}} \sum_{j=0}^{n_{SITE}} v_{ij}(t)\, e^{-\left(\frac{(X_{SAT(i)}(t) - X_{SITE(j)}(t))^2}{2\sigma_x^2} + \frac{(Y_{SAT(i)}(t) - Y_{SITE(j)}(t))^2}{2\sigma_y^2}\right)} + (\tau_{AZ(ij)}^2 + \tau_{EL(ij)}^2)$$

subject to:

(S1) $\dot{\theta}_{AZsite} = \omega_{AZsite}$ (S2) $\dot{\theta}_{ELsite} = \omega_{ELsite}$ (S3) $\dot{\omega}_{AZsite} = \frac{\tau_{AZsite}}{J_{AZsite}}$ (S4) $\dot{\omega}_{ELsite} = \frac{\tau_{ELsite}}{J_{ELsite}}$ (S5) $t_o = 0$ (S6) $(\omega_{AZ(0)site}, \omega_{EL(0)site}) = (0,0)$ (S7) $(\omega_{AZfsite}, \omega_{ELfsite}) = (0,0)$ (S8) $v_{ij} = M_{SAT \to SITE}$ (S9) $\theta_{AZmin(SITE)} \leq \theta_{ELsite} \leq \theta_{AZmax(SITE)}$ (S10) $\theta_{ELmin(SITE)} \leq \theta_{ELsite} \leq \theta_{ELmax(SITE)}$ (S11) $\omega_{AZmin(SITE)} \leq \omega_{AZsite} \leq \omega_{AZmax(SITE)}$ (S12) $\omega_{ELmin(SITE)} \leq \omega_{ELsite} \leq \omega_{ELmax(SITE)}$ (S13) $\tau_{AZmin(SITE)} \leq \tau_{AZsite} \leq \tau_{AZmax(SITE)}$ (S14) $\tau_{ELmin(SITE)} \leq \tau_{ELsite} \leq \tau_{ELmax(SITE)}$ (S15) $(x_{SAT}, y_{SAT}) = \left(\frac{\frac{\pi}{2} - \theta_{ELsat}}{\frac{\pi}{2}} \sin(\theta_{AZsat}), \frac{\frac{\pi}{2} - \theta_{ELsat}}{\frac{\pi}{2}} \cos(\theta_{AZsat})\right)$ (S16) $(x_{SITE}, y_{SITE}) = \left(\frac{\frac{\pi}{2} - \theta_{ELsite}}{\frac{\pi}{2}} \sin(\theta_{AZsite}), \frac{\frac{\pi}{2} - \theta_{ELsite}}{\frac{\pi}{2}} \cos(\theta_{AZsite})\right)$ (S17) $\sigma_x, \sigma_y = \sigma^{xSAT}, \sigma^{ySAT}$

FIG. 8

SYSTEMS AND METHODS FOR AUTONOMOUS OPERATIONS OF GROUND STATION NETWORKS

RELATION TO OTHER APPLICATIONS

This patent application is a nonprovisional of and claims benefit from U.S. Provisional application 62/528,699 filed Jul. 5, 2017, all of which is hereby incorporated in its entirety by reference.

FIELD OF THE INVENTION

One or more embodiments relates to a mission planning system for communications between one or more ground stations and a plurality of satellites.

BACKGROUND

Small spacecraft have recently emerged as an attractive and highly capable platform that enable scientists and engineers to perform missions of ever-increasing complexity. The popularity of these spacecraft can be attributed in part to the falling cost of development, miniaturization of complex electronics, shortened development life cycles, and increasingly routine access to space as rideshare/secondary payloads. The total cost for flying a small satellite mission is often orders of magnitude lower than a traditional large and more capable counterpart, allowing a growing number of worldwide participants from academia, government, and commercial industries. Given the increased popularity of small spacecraft, lowering costs, and routine access to space, the small satellite industry is poised to produce spacecraft in large quantities and field constellations of considerable size.

There exist many distributed ground station networks servicing a growing population of satellites. Traditional architectures have been established for many decades and consist of globally-dispersed radio frequency (RF) apertures that service spacecraft in all regimes, characterized by LEO, medium Earth orbit (MEO), geosynchronous/geostationary Earth orbit (GEO), and deep space. The ground station networks are responsible for operating a disaggregated population of small satellites with unique requirements such as custom tailored C2 software, different radio frequencies, waveforms, and data protocols, and varying constraints on timeliness for the mission stakeholders. Traditionally, a large team of operators are trained to factor these constraints into deconflicting assets to keep the missions on track. This process is labor-intensive and does not scale to populations of satellites in the hundreds or more given the number of deconfliction events that would need to be considered every day. The nature of small satellite missions is that they are cost constrained, and as such, automated mission operations show the greatest promise for keeping costs down while servicing a vast number of diverse satellites performing separate missions.

The problem of optimizing space-ground communications has been well-studied in recent years as the population of spacecraft and their user base has increased. Typical approaches to usage optimization has involved event deconfliction and task scheduling; techniques which address an oversubscription scheduling problem. Though some processes can be automated, they remain largely overseen by human schedulers who arbitrate complex requests with various organizations to ensure that all conflicts are resolved with enough time for the users to prepare for their schedule slot (i.e. 24-48 hours). There are many quantitative factors to consider including the orbital mechanics that enable opportunities to communicate with a ground station network, link requirements, and efficiency of the communication for both spacecraft and ground station. In addition, there exists a qualitative arbitration process that is generally difficult to quantify and model as it involves potential sensitivities such as customer rank, mission and security classification, experiment timeliness, funding, and many others.

In general, satellite communication planning and scheduling can be framed as a constrained hybrid dynamic optimization problem where the variables are discrete, continuous, dynamic, and constrained. Typical solution strategies involve forming and solving a graph problem. Thus, even a simplified version of this problem cannot be solved in nondeterministic polynomial time, also called NP-hard. In other words, it falls into a class of problems that are too complex to be solved in a realistic amount of time. Most attempts to solve this NP-hard problem approach it with a combination of graph theory and heuristics to create simplifications necessary to converge on a solution. This leads to a degree of conservatism that is contrary to the requirements of large-scale systems. The traditional means of solving the problem broadly apply across the various graph-theoretical algorithms described above and are as follows:

Step 1: Reduce the task requisition cardinality by applying heuristics where possible. This produces a subgraph with lowered complexity.

Step 2: Choose a simple closed-form solution for spacecraft attitude maneuvering so as to reduce the hybrid dynamic problem of Step 1 to a nondynamic but time-dependent graph problem.

Step 3: The problem of Step 2 is divided into separate problems of planning and scheduling. Each problem is then solved using heuristics and graph-theoretic algorithms which generate a solution to the scheduling subproblem based on a given payoff function (e.g. profit).

Step 4: The scheduling sequence from Step 3 is simulated by a high-fidelity propagator. If the test fails, the entire process or parts of the process are repeated until a desirable solution is obtained for flight operations.

It would be advantageous to provide a mission planning system which solves the scheduling and planning problem by utilizing the application of well-established pseudospectral techniques to a different formulation of the same problem. By considering the problem as a single integrated dynamic optimization problem, many of the heuristics, simplification steps, and iterative loops typically required could be subsequently eliminated. It would be further advantageous to represent the non-smooth problem as smooth and time-continuous, so that the resulting solution could satisfy static and dynamic constraint satisfaction at its first solution.

These and other objects, aspects, and advantages of the present disclosure will become better understood with reference to the accompanying description and claims.

SUMMARY

This disclosure provides a mission planning system utilizing optimal control to maximize the capacity and benefit of line-of-sight communications between satellites and their ground stations. The mission planning system formulates an optimization model and an associated cost/benefit function applicable to slewing ground-based antennas.

The mission planning system disclosed schedules the operations of one or more ground stations in order to optimize overall system communications with a plurality of satellites. The mission planning system comprises one or more ground stations and further comprises a digital processor in communication with each ground station. The digital processor acts to assess the benefits and penalties acting in the system as a whole over a given time horizon from an initial time $t_o$ to a final time $t_f$ as the plurality of satellites proceeds over expected paths. The system-wide cost function evaluated by the processor generally compares resultant SNR and slewing penalties for achievable communications between the one or more ground stations and the plurality of satellites over the desired time horizon, and provides a control vector $u_j(t)$ for each ground station describing a desired orientation of its aperture as a function of time. The digital processor determines these individual control vectors $u_j(t)$ through an optimization process, in order that various physical constraints and weighting factors pertinent to an individual ground station may be incorporated and accommodated as the digital processor optimizes overall system communications.

The novel apparatus and principles of operation are further discussed in the following description.

BRIEF DESCRIPTION OF THE DRAWINGS

FIG. 8 illustrates an exemplary optimization and associated constraints.

Embodiments in accordance with the invention are further described herein with reference to the drawings.

DETAILED DESCRIPTION OF THE INVENTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a mission planning system for communications between one or more ground stations and a plurality of satellites.

This disclosure provides a mission planning system which applies optimal control to maximize the capacity and benefit of line-of-sight communications between satellites and their ground stations. The mission planning system formulates an optimization model and an associated cost/benefit function applicable to slewing ground-based antennas, enabling communications with a diverse population of satellites in various Earth orbits. The envisioned scenario is that hundreds/thousands of these diverse satellites are perpetually serviced by tens of geographically distributed stations.

Figure 1:
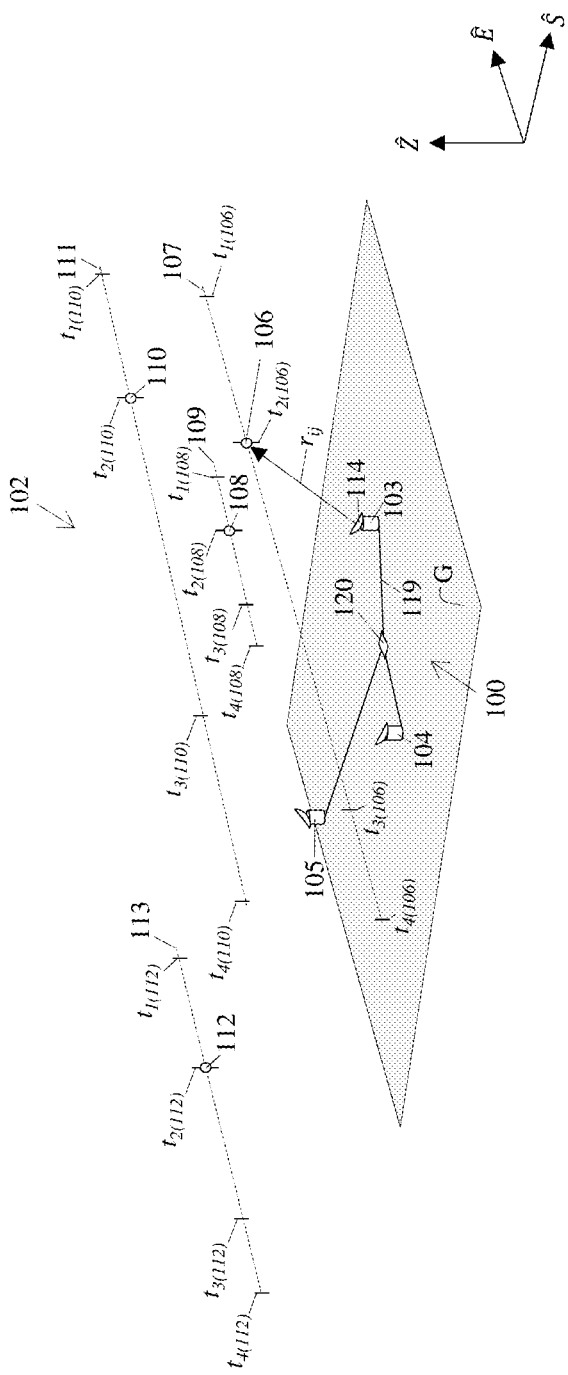
FIG. 1 illustrates a one or more ground stations and a plurality of satellites.

An exemplary mission planning scenario applicable to the mission planning system disclosed is illustrated at FIG. 1, where ground stations 103, 104, and 105 are oriented to provide communication with a plurality of satellites 102 exemplified by satellites 106, 108, 110, and 112. The ground stations 103, 104, and 105 are located on Earth's surface G while the plurality of satellites 102 are in orbit around Earth. The plurality of satellites 102 have varying altitudes above G and travel over the paths illustrated, with path 107 corresponding to satellite 106, path 109 corresponding to satellite 108, path 111 corresponding to satellite 110, and path 113 corresponding to satellite 112. Reference time marks are additionally illustrated for each path, with: two chronologically equal to $t_{1(108)}$, $t_{1(110)}$, and $t_{1(112)}$; $t_{2(106)}$ chronologically equal to $t_{2(108)}$, $t_{2(110)}$, and $t_{2(112)}$; $t_{3(106)}$ chronologically equal to $t_{3(108)}$, $t_{3(110)}$, and $t_{3(112)}$; and $t_{4(106)}$ chronologically equal to $t_{4(108)}$, $t_{4(110)}$, and $t_{4(112)}$. A topocentric-horizon coordinate system is also illustrated with corresponding axes $\hat{Z}$, $\hat{S}$, and $\hat{E}$. The various satellite paths 107, 109, 111, and 113 are illustrated similarly for clarity at FIG. 1, however it is understood that a satellite path may have any individual orientation with respect to the axes $\hat{Z}$, $\hat{S}$, and $\hat{E}$.

At FIG. 1, each of the ground stations 103, 104, and 105 comprises an aperture and corresponding pointing system, such as ground station 103 comprising aperture 114. The pointing system provides at least two degrees of freedom to the aperture in order to position the aperture so that a satellite may enter the aperture's field of view. For a given ground station to transmit to or receive from a given satellite, the aperture must be pointed toward the satellite within the beamwidth tolerance of the aperture. For example, at FIG. 1, aperture 114 of ground station 103 is pointing sufficiently toward satellite 106 to enable communications at time mark $t_{2(106)}$, and must continue to slew along path 107 in order for the communications to continue. Slewing aperture 114 to the path of an alternate satellite such as path 109 of satellite 108 would incur a penalty to the overall system with respect to utilization of ground station 103 as aperture 114 slews to track the new satellite, and during the slew ground station 103 is neither tracking or receiving communications with any satellites within satellite constellation 102. However, the benefit of allowing ground station 103 to continue tracking satellite 106 on path 107 also varies throughout the satellite's travel over path 107, based on the variance in signal strength as satellite 106 transits and slant range $r_{ij}$ varies. As it is understood, signal-to-noise ratios (SNR) vary as a function of range and other parameters, and generally a minimum RF energy needs to be received at a satellite or ground station in order for effective communication to occur. As a result of this decreasing benefit, at some point it may become advantageous to slew aperture 114 from satellite 106 to satellite 108 and absorb the slewing penalty associated with reorientation of aperture 114.

The mission planning system disclosed here acts to schedule such operations in order to optimize overall system communications with a plurality of satellites. Mission planning system 100 comprises one or more ground stations such as 103, 104, and 105, and further comprises a digital processor 120. Digital processor 120 is in communication with each ground station as exemplified by 119, and acts to assess the benefits and penalties acting in the system as a whole over a given time horizon from an initial time $t_o$ to a final time $t_f$ as the plurality of satellites 102 proceeds over the expected paths. As will be discussed further, digital processor 120 acts to evaluate a system-wide cost function generally comparing resultant SNR and slewing penalties for achievable communications between the one or more ground stations and the plurality of satellites over the desired time horizon, and provides a control vector $u_j(t)$ for each ground station describing a desired orientation of its aperture as a function of time. Additionally, digital processor 120 determines these individual control vectors $u_j(t)$ through an optimization process, in order that various physical constraints and weighting factors pertinent to an individual ground station may be incorporated and accommodated, as will be discussed.

As an example and relative to FIG. 1, ground stations 103, 104, and 105 might be arranged such that ground station 103 is tracking satellite 106 at time $t_{2(106)}$, while ground station 104 tracks satellite 108 at the chronologically equivalent time of $t_{2(108)}$, and ground station 105 tracks satellite 112 at the chronologically equivalent time of $t_{2(112)}$. In that configuration and at the chronologically equivalent time of $t_{2(110)}$, satellite 110 is not being tracked. However and as mentioned previously, the signal strength of each of the satellites varies as each transits its respective path and, in this example, the signal strength of satellite 106 referenced to ground station 103 would be expected to decrease as satellite 106 approaches the position $t_{3(106)}$ of path 107. Similarly, the signal strength of unserviced satellite 110 relative to ground station 104 would be expected to increase as satellite 110 approaches $t_{3(110)}$ on path 111. Based on these varying signal strengths and from a system-wide perspective, and given that satellite 106 has been serviced up to $t_{3(106)}$ on path 111, then at some point around the chronologically equal time marks indicated by $t_{3(106)}$, $t_{3(108)}$, $t_{3(110)}$, and $t_{3(112)}$, digital processor 120 might specify slewing the aperture of ground station 103 toward $t_{3(108)}$ to continue tracking of satellite 108, slewing the aperture of ground station 104 toward $t_{3(110)}$ to pick-up satellite 110, and maintaining ground station 105 tracking satellite 112. These actions would generate some communications forfeiture associated with dropping satellite 106 and temporarily breaking communications with satellites 108 and 110 as ground stations 104 and 105 achieve new orientations, but from a system-wide perspective over the total time horizon, this forfeiture might be outweighed by the increased benefit accrued from assuming the new posture and enabling quality communications with all satellites as they traverse paths 107, 109, 111, and 113 over the time horizon present between the various $t_1$ and $t_4$ time marks.

Digital processor 120 acts to schedule these types of operations in a manner that optimizes overall system-wide benefit using a cost function which evaluates the time-varying factors such as slant ranges, signal strengths, and target sizes against the slewing costs. Generally, the cost function considers all potential communication arrangements between all possible combinations of satellites and ground stations at a given point in time t as well as the current orientation of all ground stations at the point in time t, assesses any benefits which might accrue from switching one or more of the ground stations from its current satellite to one of the other satellites, and weighs the potential system-wide benefits against the incurred system-wide slewing costs associated with the ground stations collectively assuming a new posture. Based generally on the expected relative position of each satellite to each ground station over the time horizon, digital processor 120 minimizes the cost function in order to provide a time-parameterized control vector $u_j(t)$ to each ground station. Execution of the control vector $u_j(t)$ by each ground station over the time horizon generally utilizes the ground station configuration in a manner that minimizes the cost and maximizes the system-wide benefit, given the configuration of satellites expected over the time horizon. Use of the cost function as described provides a significant advantage over current methodologies, which typically provide scheduling without a full and rigorous evaluation of all available benefits and corresponding slewing costs, and generally result in configuration changes at less than optimal points.

Figure 2:
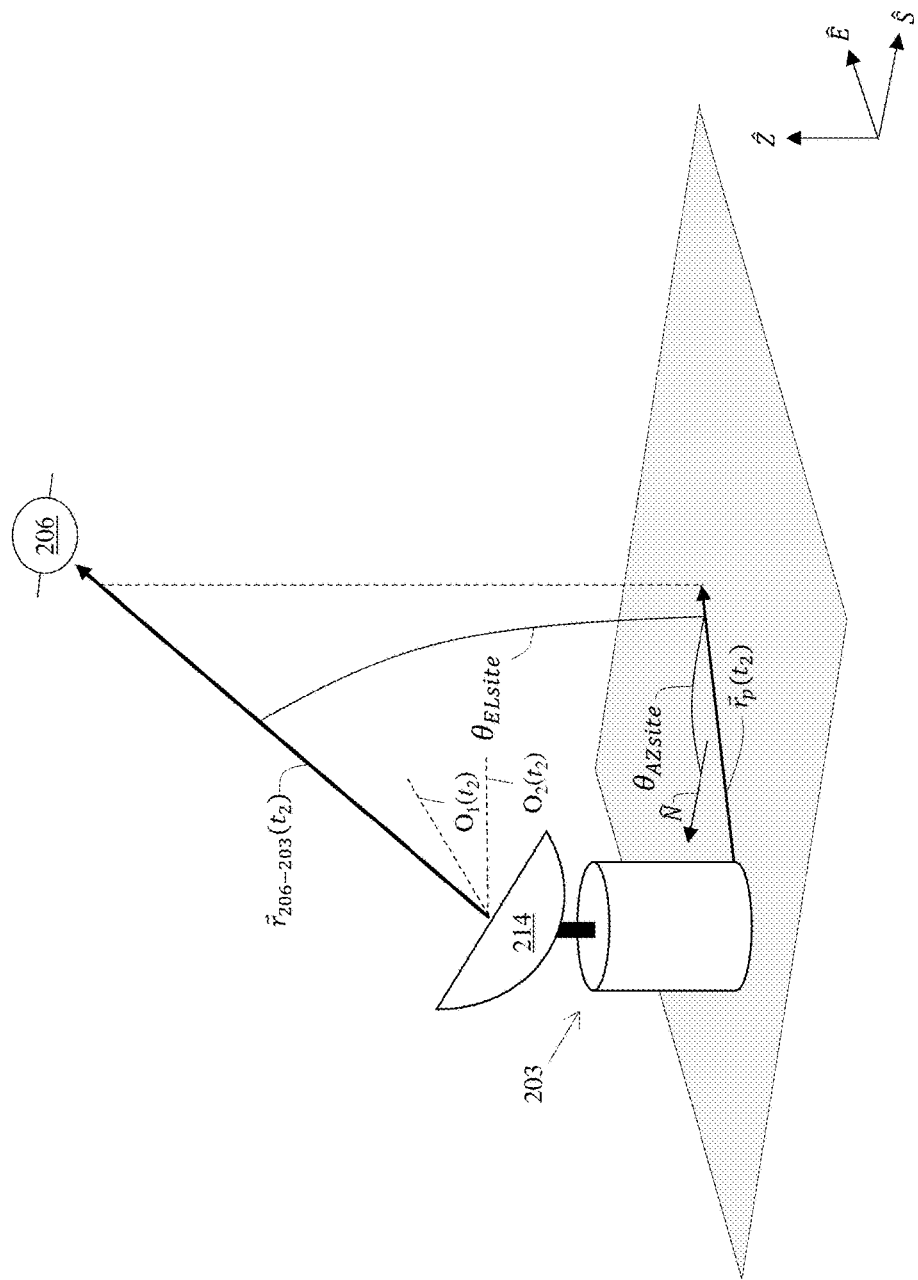
FIG. 2 illustrates a ground station oriented to communicate with a satellite.

The orientation of an aperture comprising a ground station may be described in any convenient and consistent manner, however for reference and generally throughout this disclosure, the orientation $O_j(t_k)$ of an aperture comprising a ground station j at a time $t_k$ is described by an elevation angle $\theta_{ELsite}$ and an azimuth angle $\theta_{AZsite}$. These terms are used with meanings known in the art, where $\theta_{ELsite}$ connotes an angle between a vector originating at the aperture of the ground station and the $\hat{E}$-$\hat{S}$ plane of the Topocentric-Horizon Coordinate System, and $\theta_{AZsite}$ connotes an angle between a projection of the vector on the $\hat{E}$-$\hat{S}$ plane and a direction vector $\hat{N}$ having a direction 180 degrees from the direction vector $\hat{S}$ of the Topocentric-Horizon Coordinate System. For example, FIG. 2 illustrates a ground station 203 comprising aperture 214 oriented toward a satellite 206, and with respect to the $\vec{Z}$-$\vec{E}$-$\vec{S}$ axes indicated. A slant range vector $\vec{r}_{206\text{-}203}(t_2)$ exists between ground station 203 and satellite 206 at a time $t_2$. The projection of the range vector $\vec{r}_{206\text{-}203}(t_2)$ on the $\hat{E}$-$\hat{S}$ plane defined by the $\vec{Z}$-$\vec{E}$-$\vec{S}$ axes is indicated by $\vec{r}_p(t_2)$. As illustrated, at the time $t_2$, $\theta_{ELsite}$ is the angle between $\vec{r}_{206\text{-}203}(t_2)$ and $\vec{r}_p(t_2)$, and $\theta_{AZsite}$ is the angle between the vector $\hat{N}$ and $\vec{r}_p(t_2)$. The location of ground station 203 with respect to the Earth may be described using an Earth-Centered Inertial (ECI) frame or some equivalent coordinate system, as is known to those skilled in the art. See e.g. D. Vallado and W. McClain, *Fundamentals of Astrodynamics and Applications*, (2007, $3^{rd}$), among many others.

Operations of the Mission Planning System:

In a typical embodiment, the mission planning system 100 disclosed comprises one or more ground stations such as ground stations 103, 104, and 105, where each individual ground station comprises an aperture such as 114. Each individual ground station further comprises a pointing system in mechanical communication with the aperture, where the pointing system provides at least a first degree-of-freedom (DOF) and a second DOF to the aperture. The pointing system typically comprises a controller in communication with geared motors and the geared motors in mechanical communication with the aperture through one or more intervening mechanical components, however the pointing system may be any system which acts to position the aperture toward a local azimuth and elevation in order to bring a satellite within the field-of-view. Typically the controller comprises a processor in communication with and directing the pointing system based on a control vector $u_j(t)$, which defines a specific azimuth and a specific elevation for the aperture to achieve at a given time t. Mission planning system 100 further comprises digital processor 120 in communication with each individual ground station.

Digital processor is programmed to receive a time horizon comprising an initial time $t_0$ and a final time $t_f$, and to additionally receive position data which defines a position of every satellite in a plurality of satellites at one or more time marks, where the one or more time marks are later than or chronologically equal to the initial time $t_0$ and earlier than or chronologically equal to the final time $t_f$. For example at FIG. 1, digital processor 120 might receive a time horizon with an initial time $t_0$ corresponding to the various illustrated $t_1$ delineations and a final time $t_f$ corresponding to the various illustrated $t_4$ delineations, and also receive position data defining the position of satellites 106, 108, 110, and 112 at the associated $t_1$, $t_2$, $t_3$, and $t_4$ time marks. Such position data is available from sources known to those skilled in the art. One such incarnation is the Two Line Element (TLE) set used by the United States military and distributed publically by the Joint Space Operations Center (JSpOC). These element sets, or elsets, contain orbital elements along with identifying information such as satellite catalog numbers, launch date, and additional terms which help better predict the effects of orbital perturbations such as atmospheric drag. The elsets may be fed into a propagator to predict the position of a satellite at various points in time. A common propagator is the Simplified General Perturbations Satellite Orbit Model 4 (SGP4) model. Typically the position data received by digital processor 120 and derived from sources such as elsets will be delineated on a significantly finer time scale than that illustrated at FIG. 1, relative to the various satellite paths 107, 109, 111, and 113 illustrated.

Having received the position data, digital processor 120 is programmed to determine the $u_j(t)$ for each specific ground station in the one or more ground stations by optimizing a cost function which comprises various parameters which vary for a given satellite over the time horizon. The cost function parameterizes the various parameters by time, and at each time mark $t_k$, determines an addend $A_j(t_k)$ for each specific ground station, where the addend $A_j(t_k)$ considers all communication arrangements available between the specific ground station j and every satellite i present in the constellation. Generally speaking, the addend $A_j(t_k)$ characterizes a potential communication arrangement between the specific ground station and an individual satellite at the time mark under consideration using a Benefit Value Function ($BVF_{ij}(t_k)$), which describes the potential communication arrangement in terms of parameters generally related to a slant range such as $r_{ij}$ at the time mark $t_k$, an expected signal strength, various characteristics of the satellite, and potential orientations $O_j(t_k)$ of the specific ground station at the time mark $t_k$. The addend $A_j(t_k)$ for the specific ground station further characterizes the slewing cost associated with aligning the specific ground station to the given satellite, based on the system penalty which would accrue if the specific ground station slews from its current satellite to an alternate satellite.

At each time mark $t_k$ within the time horizon and for each specific ground station j, digital processor 120 formulates the addend $A_j(t_k)$ by executing operations described generally by:

$$A_j(t_k) = \sum_{i=0}^{n_{SAT}} (BVF_{ij}(t_k)) - G_{ij}(t_k)$$

As an example and relative to FIG. 1, for ground station 103 at time mark $t_1$, the addend $A_{103}(t_1)$ would reflect an operation generally described by:

$A_{103}(t_1) = [BVF_{106\text{-}103}(t_1) - G_{106\text{-}103}(t_1)] + [BVF_{108\text{-}103}(t_1) - G_{108\text{-}103}(t_1)] + [BVF_{110\text{-}103}(t_1) - G_{110\text{-}103}(t_1)] + [BVF_{112\text{-}103}(t_1) - G_{112\text{-}103}(t_1)]$ In the above, $A_{103}(t_1)$ reflects potential communication at time $t_1$ between ground station 103 with each of the satellites 106, 108, 110, and 112, and the various $G_{i\text{-}103}(t_1)$ reflects the slewing cost associated with aligning ground station 103 to achieve respective communication with each of 106, 108, 110, and 112. As will be discussed further, both the $BVF_{i\text{-}103}(t_1)$ and $G_{i\text{-}103}(t_1)$ terms are dependent on the potential orientations $O_{103}(t_1)$ that ground station 103 might assume at $t_1$, where each potential orientation $O_{103}(t_1)$ defines an elevation angle and an azimuth angle of the aperture of the specific ground station j at the time mark $t_1$. A potential orientation $O_{103}(t_1)$ can be mapped to a value $u_{103}(t_1)$ comprising the control vector $u_{103}(t_k)$ for ground station 103, and correspondingly both $BVF_{i\text{-}103}(t_1)$ and the slewing cost $G_{i\text{-}103}(t_1)$ may be mapped to the control vector $u_{103}(t_k)$. Relative to FIG. 1, digital processor 120 would formulate similar addends for each of ground station 104 and 105 at $t_1$.

Using the addends formulated, digital processor formulates a system-wide relationship $S(t_k)$ for the time mark $t_k$ by conducting operations described generally by:

$$S(t_k) = \sum_{j=0}^{n_{SITE}} A_j(t_k)$$

For example and relative to FIG. 1, digital processor 120 would conduct similar operations at each of $t_2$, $t_3$, and $t_4$ for ground stations 103, 104, and 105 and formulate a plurality of $S(t_k)$ reflecting operations generally described by:

$$S(t_1) = A_{103}(t_1) + A_{104}(t_1) + A_{105}(t_1)$$

$$S(t_2) = A_{103}(t_2) + A_{104}(t_2) + A_{105}(t_2)$$

$$S(t_3) = A_{103}(t_3) + A_{104}(t_3) + A_{105}(t_3)$$

$$S(t_4) = A_{103}(t_4) + A_{104}(t_4) + A_{105}(t_4)$$

Digital processor 120 then considers all $S(t_k)$ generated over the time horizon and conducts an optimization in order to evaluate the potential orientations $O_j(t_k)$ of each specific ground station j at each time mark $t_k$, which as stated are present in both the $BVF_{ij}(t_k)$ and $G_{ij}(t_k)$ terms of the addends $A_j(t_k)$. In order to evaluate the potential orientations $O_j(t_k)$ that each of the ground stations j might assume at $t_k$, and to subsequently generate the operational orientations $O_j(t_k)$ that each of the ground stations j will be directed to assume at $t_k$, digital processor 120 conducts optimization operations described generally by:

$$\text{Minimize} J[x(\cdot), u(\cdot), t_f] = \int_{t_0}^{t_f} S(t_k)$$

With each $BVF_{ij}(t_k)$ and $G_{ij}(t_k)$ comprising potential orientations $O_j(t_k)$, optimization of all $S(t_k)$ present over the time horizon subject to various constraints generates an operational orientation $O_j(t_k)$ for each specific ground station j at each time mark $t_k$, The collection of operational orientations $O_j(t_k)$ which apply to the specific ground station j define the elevation and azimuth angles that the specific ground station j will be directed to assume at each time mark $t_k$, over the time horizon. These operational orientations $O_j(t_k)$ for the specific ground station j are mapped to a control vector $u_j(t_k)$ for the specific ground station j, and digital processor 120 communicates a control vector $u_j(t_k)$ to each of one or more ground stations comprising mission planning system 100. In this manner, the pointing system of each ground station may direct the respective aperture in accordance with the applicable control vector $u_j(t_k)$, and over the time horizon the one or more ground stations assume orientations which minimize overall system cost to mission planning system 100.

Benefit Value Functions $BVF_{ij}(t_k)$:

With regard to the above and as stated, the addend $A_j(t_k)$ applies to the ground station j at the specific time mark $t_k$, and functions to consider all communication arrangements possible between the ground station j and each specific satellite i in the plurality of satellites $n_{SAT}$ defined within the time horizon, and comprises a Benefit Value Function $BVF_{ij}(t_k)$ reflecting the relative conditions of the ground station j and the specific satellite i at the time mark $t_k$. This Benefit Value Function $BVF_{ij}(t_k)$ comprises a value $v_{ij}(t_k)$ and a target size $T_{ij}(t_k)$, which both reflect conditions at the time mark $t_k$, as discussed. In a particular embodiment, the Benefit Value Function $BVF_{ij}(t_k)$ reflecting the specific ground station j and the given satellite i at the given time mark $t_k$ is expressed as:

$$BVF_{ij}(t_k) = v_{ij}(t_k) T_{ij}(t_k)$$

where $v_{ij}(t_k)$ generally expresses a signal strength between the specific ground station j and the given satellite i based largely on slant range $r_{ij}(t_k)$ between the two, and $T_{ij}(t_k)$ is the target size generally reflecting the potential orientations $O_j(t_k)$ of the aperture of the ground station j relative to the position $p_i$ of satellite i at the time $t_k$.

Value $v_{ij}(t_k)$ Expressions:

The value $v_{ij}(t_k)$ is generally a reflection of the link margin between the ground station j and a particular satellite i at the time mark $t_k$. As is understood, communications systems carry additional design margin to account for uncertainties such as pointing losses, atmospheric attenuation, and realistic inefficiencies in cables, connectors, and antennas. The end goal is to generate a signal strong enough to overcome these losses such that the quantity of RF energy at the receiver is at or above the minimum requirement for the radio, called link margin. Link margins between the ground station j and a particular satellite i may be quantified using methods known in the art, and are generally dependent on the slant range $r_{ij}(t_k)$ known to digital processor 120 via the position data received. While formulating the addend $A_j(t_k)$ for a specific ground station j, digital processor 120 evaluates the link margin between the specific ground station j and a particular satellite i when assessing the $BVF_{ij}(t_k)$ between that specific ground station j and particular satellite i at the time mark $t_k$.

Figure 4:
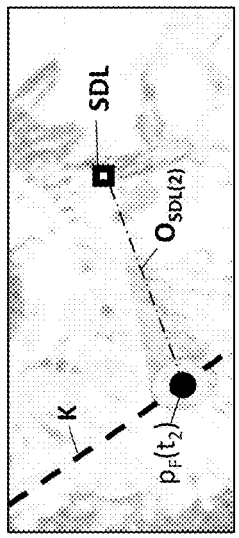
FIG. 4 illustrates the single satellite passing the ground station at a mid-point in the scenario.
Figure 5:
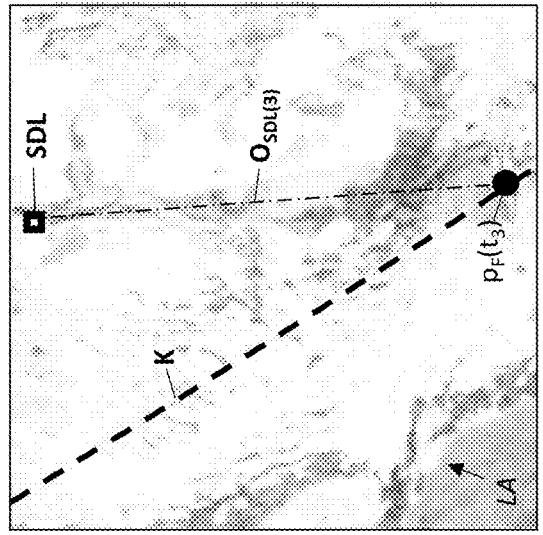
FIG. 5 illustrates the single satellite passing the ground station at a final point in the scenario.
Figure 3:
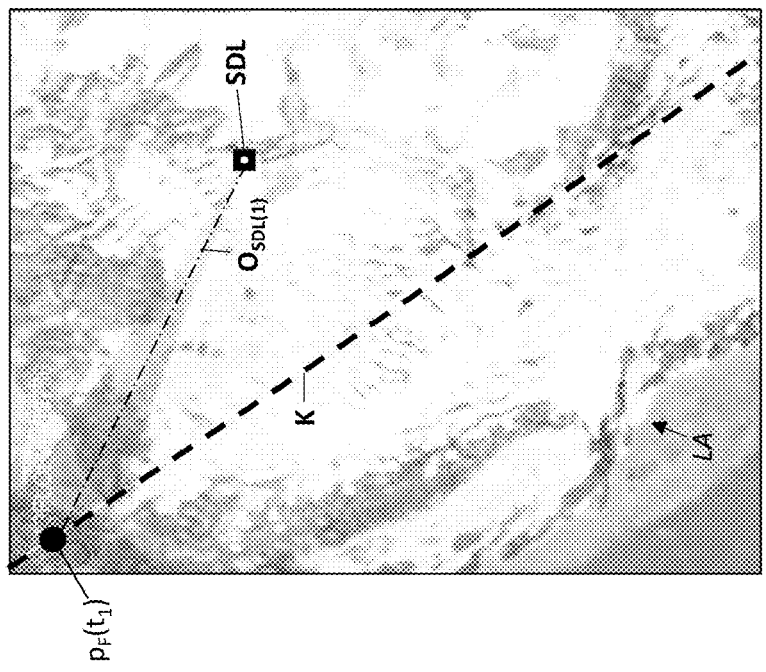
FIG. 3 illustrates a single satellite passing a ground station at an initial point in a scenario.
Figure 6:
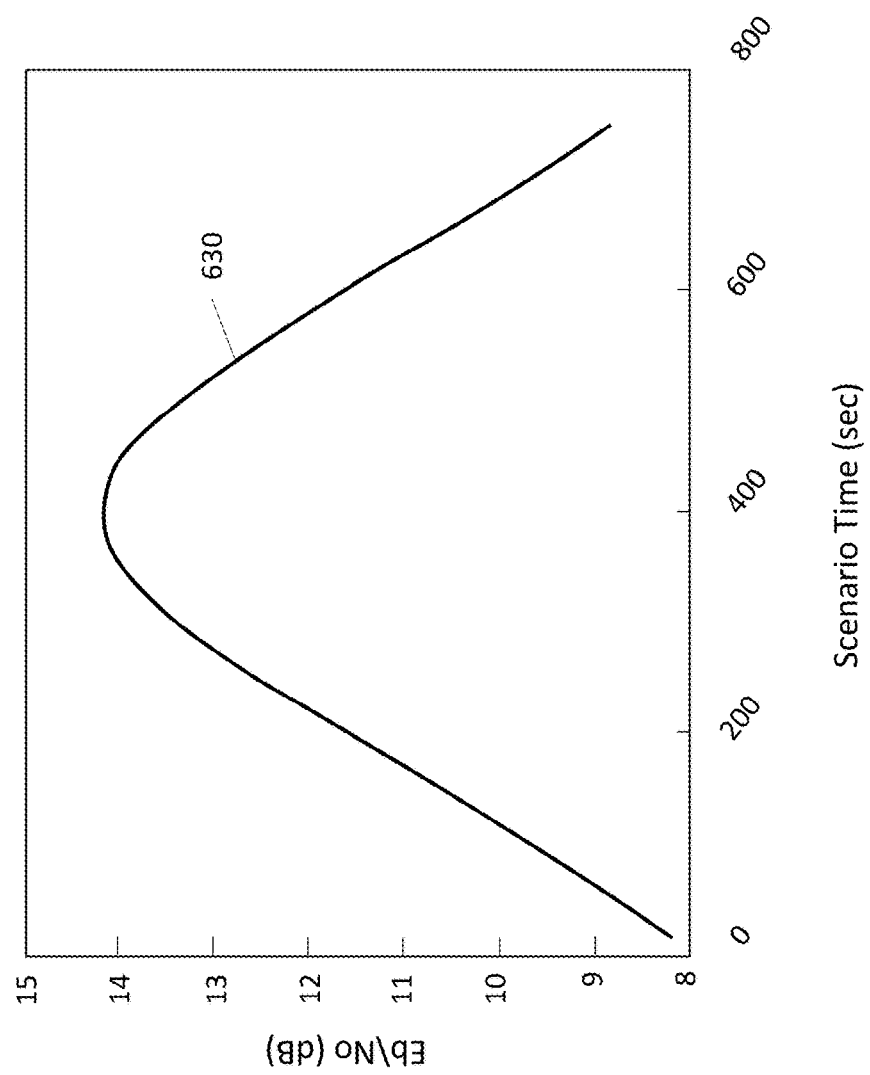
FIG. 6 illustrates a link margin for the single satellite passing the ground station.

As an example of typical $v_{ij}(t_k)$ behavior, FIGS. 3, 4, and 5 illustrate a single satellite passing a single ground station, with resulting link margin based on free space path loss calculations illustrated at FIG. 6. FIGS. 3-6 are based on a real-world example of a CubeSat designated Flora passing a Mobile CubeSat Command and Control (MC3) ground station designated SDL. FIG. 3 illustrates the start of the scenario with Flora located at position $p_F(t_1)$ on path K and ground station SDL assuming orientation $O_{SDL(1)}$ in order to track Flora within its aperture beamwidth. For geographic reference, SDL is located at Space Dynamics Laboratory, Logan, Utah-US, and Los Angeles, Calif.-US is generally indicated by LA. As Flora transits over path K the scenario progresses to FIG. 4, illustrating Flora location $p_F(t_2)$ on path K and SDL in orientation $O_{SDL(2)}$, and further progresses to FIG. 5, illustrating Flora location $p_F(t_3)$ on path K and SDL in orientation $O_{SDL(3)}$. In the overall encounter illustrated by FIGS. 3, 4, and 5, the slant-range distance between spacecraft Flora and ground station SDL varies from approximately 1,400 km to 690 km at the closest approach point. These distances can be fed into free space path loss calculations and the link margin computed for each time mark in the encounter. FIG. 6 shows the computed link margin 630 for the above scenario. In a typical embodiment, digital processor 120 quantifies the value $v_{ij}(t_k)$ by evaluating a value equation $v_{ij}(t)$ at the time mark $t_k$, where the value equation $v_{ij}(t)$ is at least dependent on the slant range $r_{ij}(t_k)$ between a satellite i and a ground station j at the time mark $t_k$.

Target Size $T_{ij}(t_k)$ Expressions:

The target size $T_{ij}(t_k)$ of the Benefit Value Function $BVF_{ij}(t_k)$ is generally an expression representing the degree to which potential orientations $O_j(t_k)$ for a ground station j is aligned with a position $p_i(t_k)$ of a satellite i at the time $t_k$. "Aligned" in this sense means that the aperture of the ground station j is established in an orientation such that the position $p_i$ of a satellite i is within the beamwidth of the aperture. The "position $p_i(t_k)$ of a satellite i" means a location of the satellite i at the time mark $t_k$ relative to the location of the ground station j at the time mark $t_k$. Typically, digital processor 120 determines the target size $T_{ij}(t_k)$ by evaluating a target size equation $T_{ij}(t)$ at the time mark $t_k$. In some embodiments, the target size equation $T_{ij}(t)$ is a continuous function in the distinct coordinate frame over a range of the position $p_i$ of a satellite i and the potential orientations $O_j(t_k)$ of the aperture of the ground station j. In other embodiments, the target size equation $T_{ij}(t)$ has an extremum such as a maxima, minima, local maxima, and/or local minima in the neighborhood of the position $p_i$ of the satellite i. In other embodiments, the target size equation $T_{ij}(t)$ is a descriptive function comprising a position $p_i(t)$ of a satellite i referenced to a distinct coordinate frame, and further comprising potential orientations $O_j(t)$ of a ground station j referenced to the same distinct coordinate frame.

In a specific embodiment and reflecting dependence on a degree of alignment, in some cases the target size equation $T_{ij}(t)$ is an expression having an absolute value $|T_{ij}(t)|$ which increases over at least an interval of the potential orientation $Oj(t_k)$ as a vector dot product of the potential orientation $Oj(t_k)$ and a unit vector of the slant range $r_{ij}(t_k)$ increases. For example, at FIG. 2, where $O_1(t_2)$ and $O_2(t_2)$ illustrates potential orientations the aperture 214 of ground station 203 might assume, and $\vec{r}_{206\text{-}203}(t_2)$ is a slant range vector from ground station 203 to satellite 206, in certain embodiments the absolute value $|T_{ij}(t)|$ increases as the vector dot product of the potential orientations and a unit vector of the slant range $\vec{r}_{206\text{-}203}(t_2)$ increases, such that $|T_{ij}(t)|$ reflects greater degrees of alignment with satellite 206 as the potential orientations rotate from $O_2(t_2)$ to $O_1(t_2)$.

In a further embodiment, the function comprising the target size equation $T_{ij}(t)$ is a continuous function in the distinct coordinate frame over a range of the position $p_i$ of a satellite i and the potential orientations $Oj(t_k)$ of the aperture of the ground station j. In an additional embodiment, the target size equation $T_{ij}(t)$ has an extremum such as a maxima, minima, local maxima, and/or local minima in the neighborhood of the position $p_i$ of the satellite i.

In a specific embodiment, the target size $T_{ij}$ at a time mark $t_k$ is expressed as:

$$T_{ij}(t_k) = e^{-\left(\frac{(X_{SAT(i)}(t_k)-X_{SITE(j)}(t_k))^2}{2\sigma_x^2}+\frac{(Y_{SAT(i)}(t_k)-Y_{SITE(j)}(t_k))^2}{2\sigma_y^2}\right)}$$

where the position $p_i$ of a satellite i at the time $t_k$ is described in a distinct coordinate frame by $X_{SAT(i)}(t_k)$ and $Y_{SAT(i)}(t_k)$ and reflects other physical characteristics associated with the given satellite i with the parameters $\sigma_x$ and $\sigma_y$. Potential orientations that the aperture of a ground station j might assume at the time mark $t_k$ and in the distinct coordinate frame are described by $X_{SITE(j)}(t_k)$ and $Y_{SITE(j)}(t_k)$. In another embodiment, the target size $T_{ij}$ at a time mark $t_k$ is expressed as:

$$T_{ij}(t_k) = e^{-\left(\frac{(\delta_{SAT(i)}\cdot\delta_{SITE(j)}-1)^2}{2\sigma^2}\right)}$$

where a vector $\delta_{SITE(j)}$ expresses the direction of a signal beam from a ground station j and a vector $\delta_{SAT(i)}$ expresses the direction of a slant range vector $\vec{r}_{ij}$ from the ground station j to the satellite i, and where both $\delta_{SITE(j)}$ and $\delta_{SAT(i)}$ intersect at some point typically comprising or in the close proximity of the ground station j, and where $\sigma$ reflects physical characteristics associated with the satellite i. The dot product $\delta_{jSITE}\cdot\delta_{iSAT}$ is maximized when the satellite range vector and antenna boresight are generally aligned.

Slewing Cost $G_{ji}(t_k)$ Expressions:

The slewing cost $G_{ij}(t_k)$ comprising the addend $A_j(t_k)$ for the ground station j reflects the slewing cost of ground station j assuming the potential orientations $Oj(t_k)$ present in the target size $T_{ij}(t_k)$ comprising the Benefit Value Function $BVF_{ij}(t_k)$. In a particular embodiment, the slewing cost $G_{ij}(t_k)$ comprises terms $\tau_{AZ(ij)}$ and $\tau_{EL(ij)}$, which describe azimuthal and elevation torques required by ground station j in order to slew ground station j to a potential orientation toward a satellite i. In other embodiments, the slewing cost $G_{ij}(t_k)$ comprises terms $\tau_{AZ(ij)}^2$ and $\tau_{EL(ij)}^2$ in order to relate the respective torques to the aperture position of the potential orientation of the ground station j.

Typically, digital processor 120 determines the slewing cost $G_{ij}(t_k)$ by evaluating a slewing cost equation $G_{ij}(t)$ at the time mark $t_k$. In certain embodiments, the slewing cost equation $G_{ij}(t)$ is a descriptive function comprising the position $p_i(t)$ of a satellite i referenced to a distinct coordinate frame, and further comprising the potential orientations $O_j(t)$ of a ground station j referenced to the same distinct coordinate frame. In certain embodiments and reflecting slewing cost dependence on a degree of alignment, in some cases the slewing cost equation $G_{ij}(t)$ is an expression having an absolute value $|G_{ij}(t)|$ which decreases over at least an interval of the potential orientation $Oj(t_k)$ as a vector dot product of the potential orientation $Oj(t_k)$ and a unit vector of the slant range $r_{ij}(t_k)$ increases. For example, at FIG. 2, with $O_1(t_2)$ and $O_2(t_2)$ illustrating potential orientations as before, in certain embodiments the absolute value $|G_{ij}(t)|$ decreases as a vector dot product of the potential orientations and a unit vector of the slant range $\vec{r}_{206\text{-}203}(t_2)$ increases, such that the slewing cost associating with aligning with satellite 206 decreases as the potential orientations rotate from $O_2(t_2)$ to $O_1(t_2)$.

Formulation and Optimization of the Cost Function:

As discussed, at each time mark $t_k$ within the time horizon, digital processor 120 formulates an addend $A_j(t_k)$ for each specific ground station j at the time mark $t_k$, enroute to determining a control vector $u_j(t)$ for the specific ground station j. At the outset of the solution and the formulation of the addend $A_j(t_k)$ for the specific ground station j, the orientation that the ground station j assumes at the time mark $t_k$ is unknown, however potential orientations $O_j(t_k)$ are, as discussed, present in both the $BVF_{ij}(t_k)$ and slewing cost $G_{ij}(t_k)$ comprising each $A_j(t_k)$. Digital processor 120 conducts operations similar to the above such that at each specific time mark $t_k$, digital processor 120 may establish a system-wide relationship $S(t_k)$ described generally by a summation of the addends for the time $t_k$, as:

$$S(t_k) = \sum_{j=0}^{n_{SITE}}\left(\sum_{i=0}^{n_{SAT}}(v_{ij}(t_k)T_{ij}(t_k))-G_{ij}(t_k)\right)$$

At each time mark $t_k$, $S(t_k)$ thereby represents an expression of the potential benefits and penalties present within the overall system at the time mark $t_k$, as a general function of the various potential orientations $O_j(t_k)$ that grounds stations such as 103, 104, and 105 might assume. Digital processor 120 then determines an operational orientation $O_j(t_k)$ for each ground station j by simultaneously considering all $S(t_k)$ generated for every time mark $t_k$ over the time horizon and performing optimization generally described by:

$$\text{Minimize } J[x(\bullet), u(\bullet), t_f] = \int_{t_0}^{t_f} \sum_{j=0}^{n_{SITE}} \left( \left( \sum_{i=0}^{n_{SAT}} (v_{ij}(t) T_{ij}(t)) - G_{ij}(t) \right) \right)$$

Minimizing the cost function above generates values for the terms $T_{ij}(t)$, and $G_{ij}(t)$ at each time mark $t_k$ from $t_o$ to $t_f$, and because $T_{ij}(t)$, and $G_{ij}(t)$ are dependent on the azimuth and elevation of the ground station j and may be mapped to a control vector $u_j(t)$ for the ground station j, minimizing the cost function above generates a control vector $u_j(t)$ for the ground station j over the time horizon, where the control vector $u_j(t)$ defines control variables that orient the aperture of the ground station j to a specific azimuth and a specific elevation.

For example, by substituting some of the specific embodiments disclosed, digital processor 120 might perform operations generally described by:

$$\text{Minimize } J[x(\bullet), u(\bullet), t_f] =$$

$$\int_{t_0}^{t_f} \sum_{j=0}^{n_{SITE}} \sum_{i=0}^{n_{SAT}} v_{ij}(t) e^{-\left( \frac{(X_{SAT(i)}(t) - X_{SITE(j)}(t))^2}{2\sigma_x^2} + \frac{(Y_{SAT(i)}(t) - Y_{SITE(j)}(t))^2}{2\sigma_y^2} \right)} +$$

$$\tau_{AZ(ij)}^2 + \tau_{EL(ij)}^2$$

Minimization of this cost function generates values for the terms $X_{SITE(j)}$, $Y_{SITE(j)}$, $\tau_{AZ(ij)}$, and $\tau_{EL(ij)}$ at each time mark $t_k$ from $t_o$ to $t_f$, or equivalently, since those terms are dependent on the control vector $u_j(t)$ for the ground station j over the time horizon, minimization generates the control vector $u_j(t)$ for the ground station j over the time horizon, where the control vector $u_j(t)$ defines control variables that orient the aperture of the ground station j to a specific azimuth and a specific elevation.

In this manner, the digital processor 120 of mission planning system 100 determines a control vector $u_j(t)$ for each specific ground station j in the one or more ground stations by optimizing the cost function, such that the ground stations such as 103, 104, and 105 may orient over the time horizon from the initial time $t_o$ to the final time $t_f$ in a manner that optimizes or more effectively utilizes the capacity of the mission planning system when charged with communication for a constellation of satellites, such as plurality of satellites 102. Additionally and as will be discussed further, because digital processor 120 determines these individual control vectors $u_j(t)$ through an optimization process, various physical constraints and weighting factors pertinent to an individual ground station j may be incorporated and accommodated. For example, one or more constraints on angular velocity in a first or second degree of freedom for some individual ground station j can be formulated such that the optimization of the cost function occurs subject to the angular velocity constraint, and the resultant control vector $u_j(t)$ does not result in ground station j attempting to violate the limit. Additional constraints may further describe elevation or azimuthal constraints, so an individual ground station j is not directed to an unachievable physical configuration or is driven to consider satellites below a local horizon. Further, satellites in a plurality of satellites may be individually ranked based on the importance of communications with specific satellites during a time horizon occurring using, for example, the value function $v_{ij}(t)$, so that the optimization process prioritizes communication with higher ranked satellites.

Figure 7:
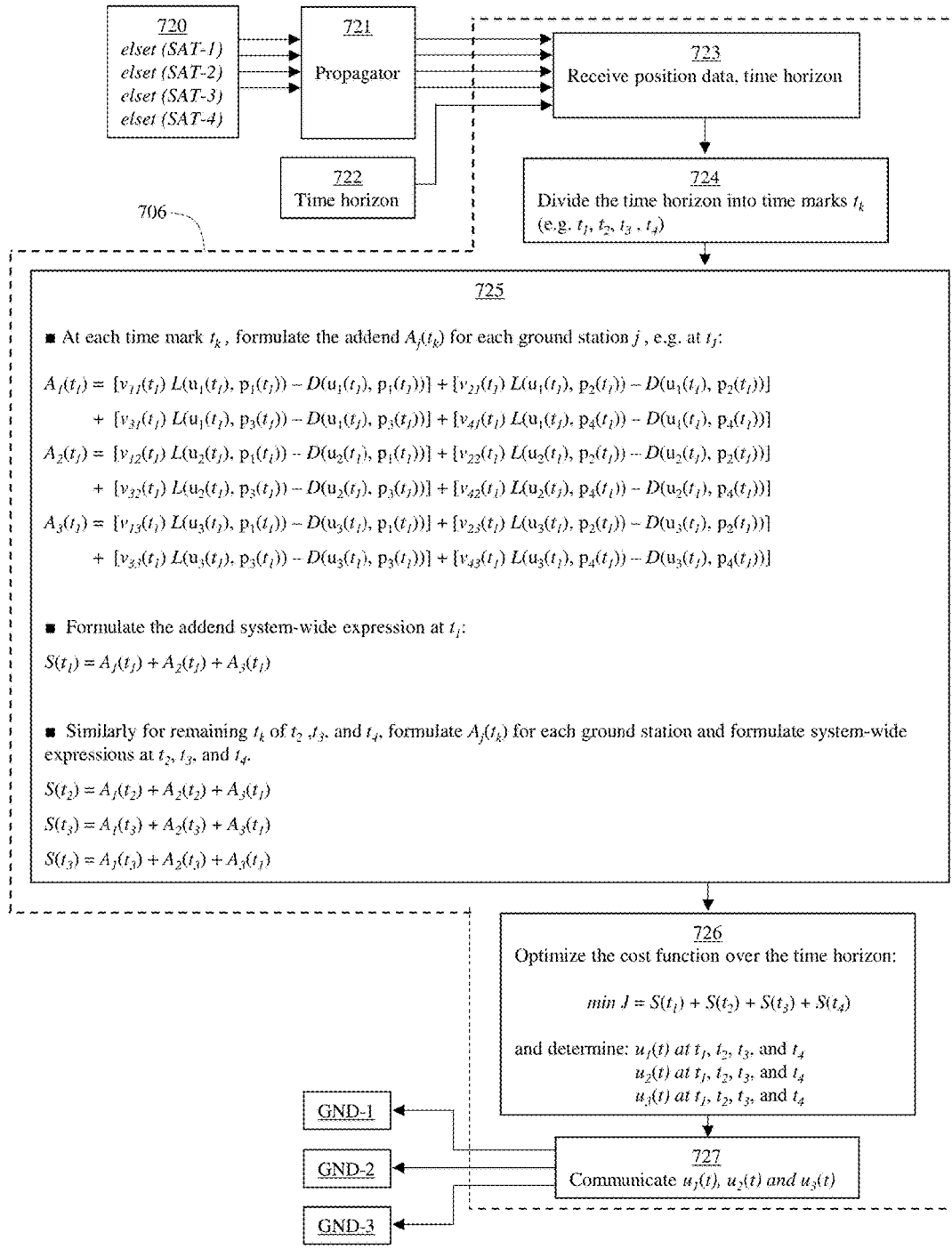
FIG. 7 illustrates an exemplary operation of the mission planning system.

FIG. 7 illustrates an exemplary operation of the mission planning system, with digital processor 706 determining control vectors $u_j(t)$ for ground stations GND-1, GND-2, and GND-3 for communication with satellites SAT-1, SAT-2, SAT-3, and SAT-4, in a situation analogous to FIG. 1. At FIG. 7, at 720, elset data for the 4 satellites is provided to digital processor 706 via propagator 721, and a time horizon is provided at 722. At 723, digital processor 706 receives the position data and time horizon, and at 724 divides the time horizon into a plurality of time marks $t_1$, $t_2$, $t_3$, and $t_4$. At 725, digital processor 706 formulates an addend $A_j(t_k)$ for each of ground stations GND-1, GND-2, and GND-3 at each of the time marks $t_1$, $t_2$, $t_3$, and $t_4$. As discussed, within the addends $A_j(t_k)$, the terms $v_{ij}(t)$, $T_{ij}(t)$, and $G_{ij}(t)$ are dependent on the potential azimuth and elevation the ground station j might assume, and these terms can be mapped to a control vector $u_j(t)$ for the ground station j, where the control vector $u_j(t)$ defines control variables that orient the aperture of the ground station j to the potential azimuth and the potential elevation. At 725, a function $L(u_j(t_k), p_i(t_k))$ maps the $T_{ij}(t)$ portion of the Benefit Value Function to a $u_j(t)$ space for a ground station j based on the position data $p_i$ received for a satellite i. Similarly, a function $D(u_j(t_k), p_i(t_k))$ maps the slewing cost $G_{ij}(t)$ to the $u_j(t)$ space for the ground station j. Correspondingly, the addend for a ground station j which considers each satellite i is expressed as:

$$A_j(t_k) = \sum_{i=0}^{n_{SAT}} v_{ij} L(u_j(t_k), p_i(t_k)) - D(u_j(t_k), p_i(t_k)).$$

At 725 and for ease of illustration, the ground stations GND-1, GND-2, and GND-3 are treated as having equivalent physical characteristics such that a single $L(u_j(t_k), p_i(t_k))$ and $D(u_j(t_k), p_i(t_k))$ apply to all three, however it is understood that each ground station j could have unique $L_j(u_j(t_k), p_i(t_k))$ and $D_j(u_j(t_k), p_i(t_k))$ mapping functions.

Correspondingly at 725, digital processor 706 formulates an addend for each of GND-1, GND-2, and GND-3 reflecting potential communications with each of SAT-1, SAT-2, SAT-3, and SAT-4 satellites for the time mark $t_1$, as indicated by $A_1(t_1)$, $A_2(t_1)$, and $A_3(t_1)$ respectively. Digital processor 706 formulates the system-wide expression for time mark $t_1$ as $S(t_1) = A_1(t_1) + A_2(t_1) + A_3(t_1)$. Digital processor 706 conducts similar operations for each of $t_2$, $t_3$, and $t_4$, producing $S(t_2)$, $S(t_3)$, and $S(t_4)$, in order to formulate the cost function to be minimized.

At 726, digital processor 706 minimizes the cost function and generates $u_1(t)$, $u_2(t)$, and $u_3(t)$ based on the minimizing the cost function at $t_1$, $t_2$, $t_3$, and $t_4$. At 727, digital processor 706 communicates $u_1(t)$, $u_2(t)$, and $u_3(t)$ to GND-1, GND-2, and GND-3 respectively in order to track SAT-1, SAT-2, SAT-3, and SAT-4 over the time horizon in a manner which more fully exploits the capabilities of the existing ground assets in the mission planning system.

Minimization of a cost function in order to determine control vectors $u_j(t)$ as described above may be accomplished through optimization techniques known in the art. See e.g. Ross et al., "Pseudospectral Methods for Optimal Motion Planning of Differentially Flat Systems," *IEEE Transactions on Automatic Control* 49(8) (2004); see also Ross et al., "Issues in the real-time computation of optimal control," *Mathematical and Computer Modelling* 43 (2006); see also Ross et al., "A Unified Computational Framework for Real-Time Optimal Control," *Proceedings of the 42$^{nd}$ IEEE Conference on Decision and Control* (2003); see also Ross et al., "A Review of Pseudospectral Optimal Control: From Theory to Flight," *Annual Reviews in Control* 36 (2012), among others.

The disclosure additionally provides a method for mission planning of ground station networks. The method generally comprises identifying one or more ground stations, where each comprises an aperture and further comprises a pointing system in mechanical communication with the aperture, where the pointing system establishes the aperture at a specific azimuth and a specific elevation in accordance with a control vector $u_j(t)$ provided to the each individual ground station. The method further comprises determining a time horizon comprising an initial time $t_o$ and a final time $t_f$, and preparing position data defining a position for each satellite comprising a plurality of satellites at one or more time marks, where the one or more time marks are later than or chronologically equal to the initial time $t_o$ and earlier than or chronologically equal to the final time $t_f$. The method further comprises providing one or more control vectors to the one or more ground stations by determining a control vector $u_j(t)$ for each specific ground station j in the one or more ground stations by optimizing a cost function in a manner similar to that described previously. The method further comprises communicating the control vector $u_j(t)$ for each specific ground station j to the one or more ground stations, thereby providing the one or more control vectors to the one or more ground stations.

The disclosure further provides an apparatus for satellite communications comprising one or more ground stations, where each comprises an aperture and further comprises a pointing system in mechanical communication with the aperture, where the pointing system is configured to establish the aperture at a specific azimuth and a specific elevation in accordance with a control vector $u_j(t)$. The apparatus further comprises a digital processor in communication with each of the one or more ground stations, with the digital processor comprising a memory and the memory storing instructions executable by the digital processor, where the instructions describe determining a control vector $u_j(t)$ for each specific ground station j in the one or more ground stations by optimizing a cost function in a manner similar to that described previously. The instructions further describe communicating the control vector $u_j(t)$ for each specific ground station j to the one or more ground stations, thereby providing the one or more control vectors to the one or more ground stations.

Specific Embodiments and Examples

Simulations were performed using data from real-world CubeSat missions with outputs of these simulations formatted to run on Mobile CubeSat Command and Control (MC3) ground stations thereby allowing them to be tested in the field with real satellites and ground stations. The MC3 ground station network was created as an alternative to high cost assets for small satellite research and development (R&D) missions. The network operations center is located at the Naval Postgraduate School, Monterey, Calif.-US and primarily consists of low-cost commercial-off-the-shelf (COTS) components and government-off-the-shelf (GOTS) software hosted at partner institutions in geographically diverse locations. There are nine remotely operated stations fielded around the United States that constitute the MC3 network.

Two satellites operated by the MC3 network were used. The satellites were launched into a 550 km circular orbit with 63° inclination in October 2015 and are named Flora and Merryweather. Due to slightly different altitudes at orbital insertion, one satellite slowly overtakes the other in their orbital plane for a three-week window approximately every three months. Correspondingly, when the positions of Flora and Merryweather overlap, they are simultaneously in view of ground assets that are normally constrained to communicate with only one satellite at a time. Though the single ground station/single satellite constraint remains, an optimized antenna slew seeks to maximize contact time with each satellite as a function of each satellite's BVF.

Deconfliction trajectories were generated with MATLAB and the DIDO computational package. The model described in the previous sections was translated into MATLAB syntax and fed into the DIDO optimizer. Inputs into the model were generated using SYSTEMS TOOL KIT (STK) 10 propagation software, which allows ephemerides of satellites and their ground stations to be calculated for a given time period. By finding times in which the Flora and Merryweather satellites were in simultaneously in view of one or more ground stations, the ephemerides for these events could be exported from STK into MATLAB for processing by the DIDO optimizer.

TLEs describing Flora and Merryweather were obtained and using STK 10 for orbit analysis, the satellite and ground station ephemeris was converted into Earth Centered Earth Fixed (ECEF) coordinates for a given deconfliction event. In an ECEF reference frame, a ground-based site remains constant while the coordinates of a satellite vary as a function of the orbit, Earth's rotation, spacecraft maneuvers, and orbital perturbations.

The examples described and discussed below generated control vectors $u_j(t)$ for specific ground stations j by performing operations as illustrated at FIG. 8, with the cost function $J[x(\bullet), u(\bullet), t_f]$ minimized subject to the constraints listed. The listed constraints at are exemplary only, however relative to FIG. 8, (S1) and (S2) define angular rotation rates $\omega_{AZsite}$ and $\omega_{ELsite}$ of an aperture of a ground station j in terms of its orientation defined by $\theta_{AZsite}$ and $\theta_{ELsite}$; (S3) and (S4) relate the angular accelerations $\omega_{AZsite}$ and $\omega_{ELsite}$ to torques $\tau_{AZsite}$ and $\tau_{ELsite}$ expended to orient the aperture, using rotational moments of inertia $J_{AZsite}$ and $J_{ELsite}$ respectively. (S5) defines the initial time $t_o$ at the start of the time horizon, and (S6) and (S7) constrain the aperture of the ground station j from orienting in a direction which passes through Earth's surface. (S8) defines the value function $v_{ij}$ based on the link margin M between the ground station j and a satellite i. (S9), (S10), (S11), (S12), (S13), and (S14) define limits based on the physical characteristics of the ground station j. (S15) expresses satellite i location ($x_{SAT}$, $y_{SAT}$) in a Cartesian azimuth/elevation polar coordinate system, (S16) expresses ground station j location ($x_{SITE}$, $y_{SITE}$) in the Cartesian azimuth/elevation polar coordinate system, and (S17) expresses the satellite i parameters $\sigma_x$ and $\sigma_y$ in the Cartesian azimuth/elevation polar coordinate system.

Example 1: Two Satellites, One Ground Station

In the first example, a single ground station located at Space Dynamics Laboratory (SDL), Logan, Utah-US was used for tracking of Flora and Merryweather. The BVF was equally weighted for both satellites and dependent on varying link margins with SDL station over satellite transit. The BVF of each satellite was correspondingly greatest at its closest approach. The two satellites in this scenario are separated by approximately five minutes. The SDL station antenna tracks operates in accordance with a control vector $u_{SDL}(t)$ determined by the mission planning system as previously described, such that SDL tracks one satellite until doing so is less valuable than transitioning to the trailing satellite.

Figure 10:
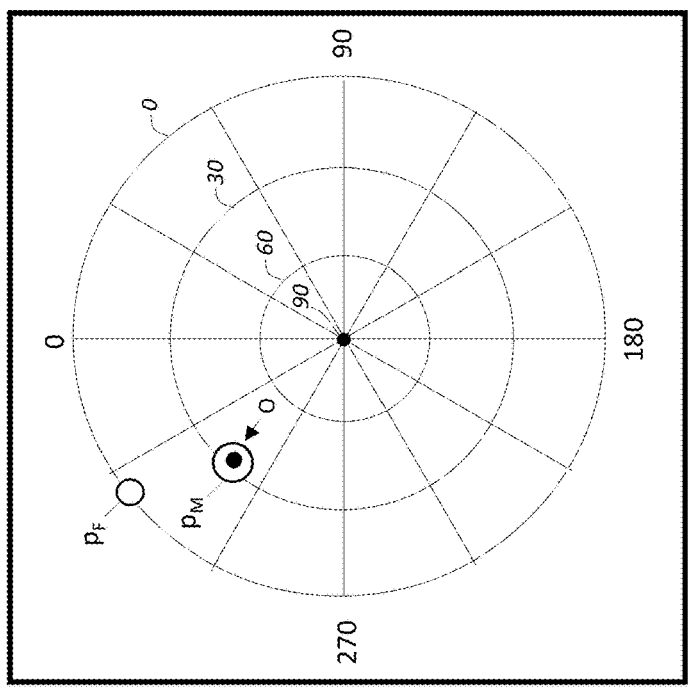
FIG. 10 illustrates a Cartesian polar plot at the initial point in the additional scenario.
Figure 9:
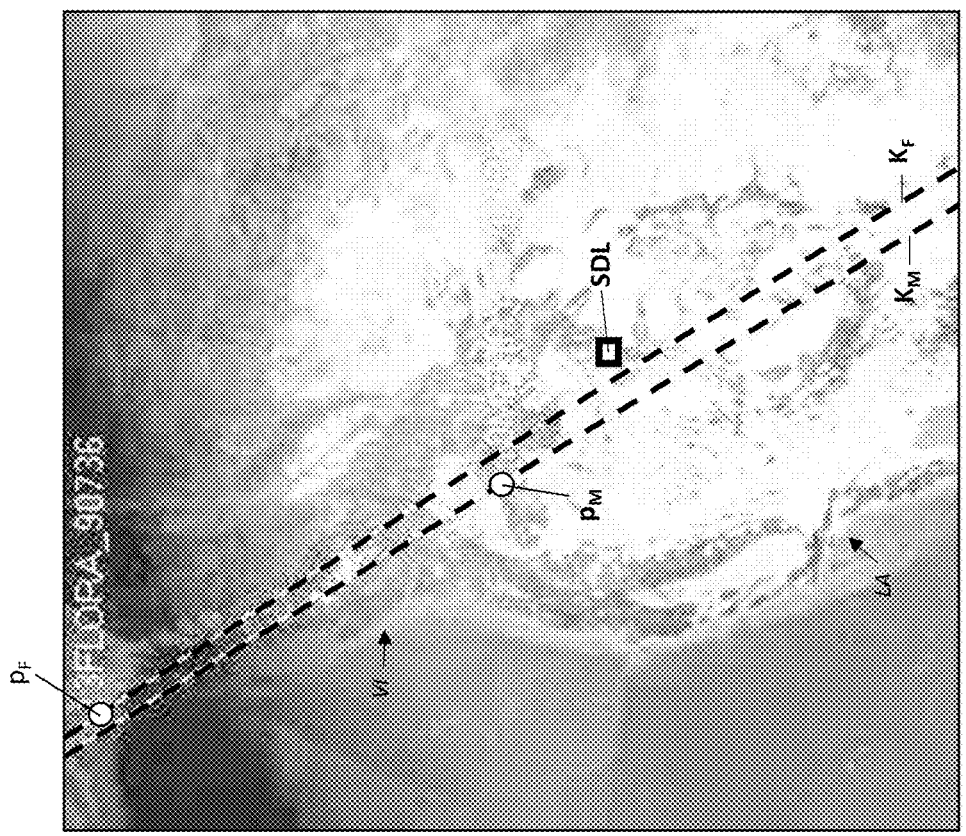
FIG. 9 illustrates two satellites passing a ground station at an initial point in an additional scenario.

FIG. 9 illustrates the scenario start, with Flora at position $p_F$ on path $K_F$ and Merryweather at position $p_M$ on path $K_M$. As stated, the single ground station SDL is located at Logan, Utah-US. For additional geographic reference at FIG. 9, Los Angeles, Calif.-US is generally indicated by LA and Vancouver Island, BC-CA is generally indicated by VI. FIG. 10 illustrates a Cartesian azimuth/elevation polar plot centered on SDL and providing azimuth angles of 0, 90, 180, and 270 as radial lines and elevation angles of 0, 30, 60, and 90 as concentric circles. The positions $p_F(t_1)$ and $p_M(t_1)$ are as indicated. Additionally on FIG. 10, the orientation based on the azimuth and elevation of the aperture of SDL is the black circle generally indicated by O. The coincident orientation O and position $p_M$ reflect that at the start of the scenario the control vector $u_{SDL}(t)$ is directing SDL to track Merryweather, while Flora is on the horizon and providing a much lower benefit than Merryweather.

Figure 11:
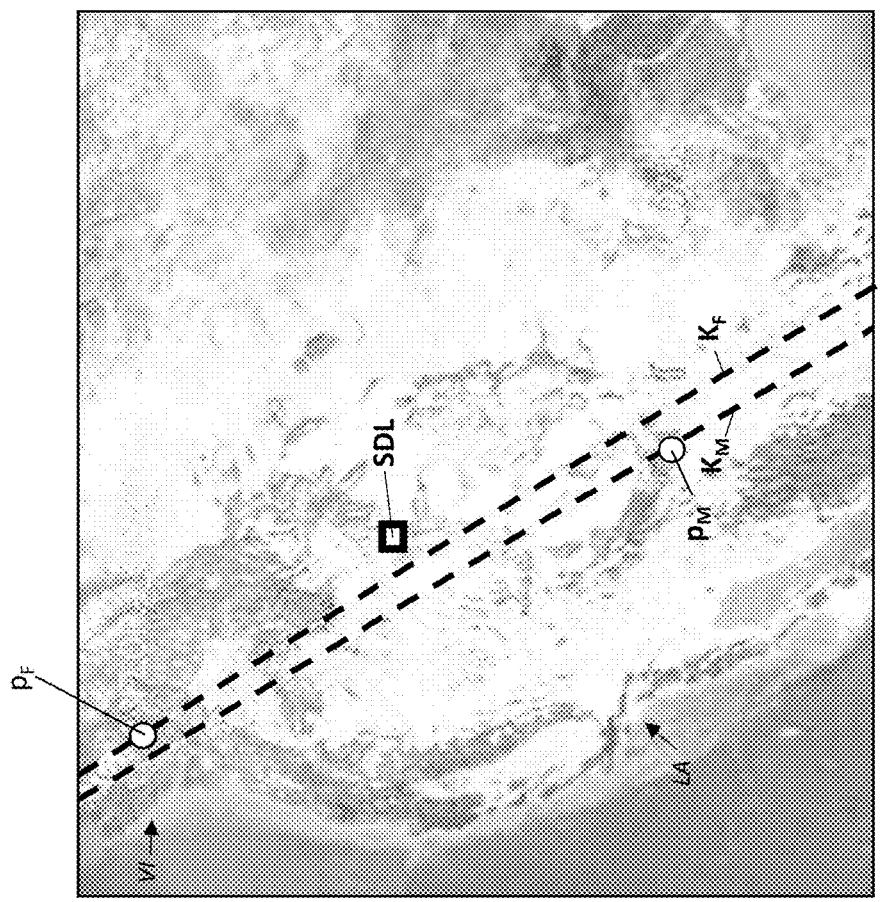
FIG. 11 illustrates the two satellites passing the ground station at a mid-point in the additional scenario.
Figure 14:
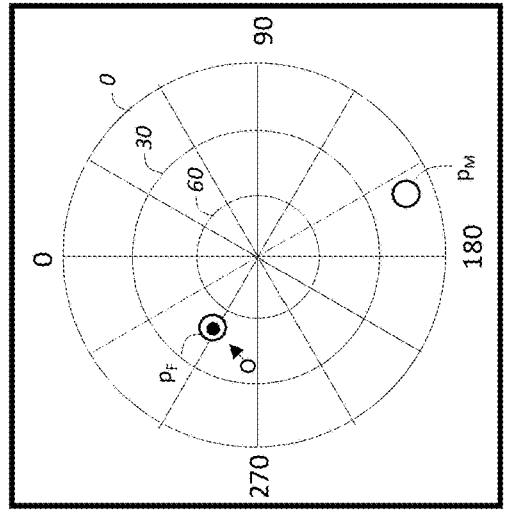
FIG. 14 illustrates a Cartesian polar plot at a third point in the mid-point of the additional scenario.
Figure 13:
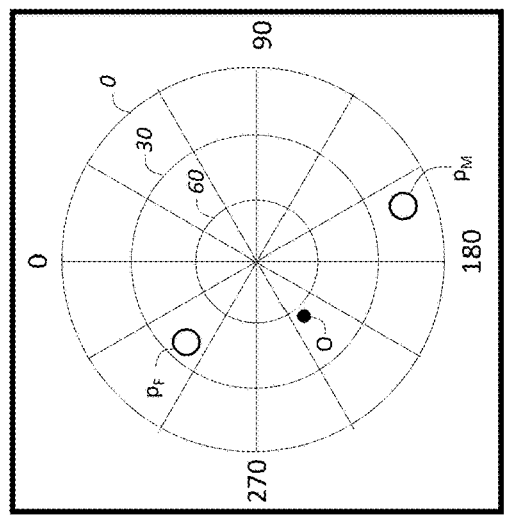
FIG. 13 illustrates a Cartesian polar plot at a second point in the mid-point of the additional scenario.
Figure 12:
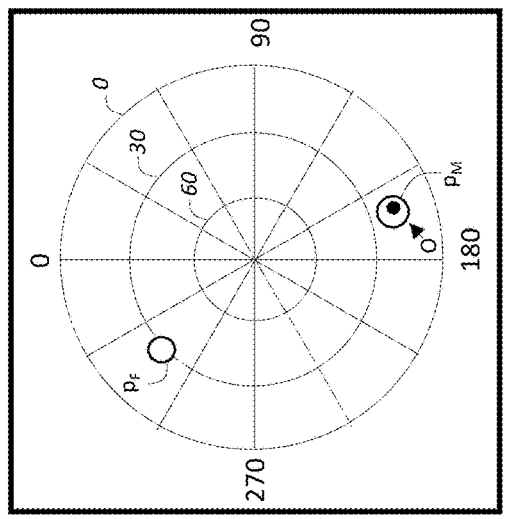
FIG. 12 illustrates a Cartesian polar plot at a first point in the mid-point of the additional scenario.

FIG. 11 illustrates a scenario midpoint, with Flora at position $p_F$ on path $K_F$ and Merryweather at position $p_M$ on path $K_M$, relative to SDL and with the general indications for LA and VI provided for reference. At the initial period of the scenario midpoint, SDL is continuing to track Merryweather as indicated by FIG. 12, which illustrates $p_F$ and $p_M$ within the Cartesian azimuth/elevation polar plot framework as well as the orientation O of SDL, still largely coincident with $p_M$. However, as the scenario continues, the mission planning system recognizes that the decreasing benefit of Merryweather is being surpassed by the increasing benefit from Flora, and the control vector $u_{SDL}(t)$ for SDL directs transitioning from tracking Merryweather to Flora. This transition is illustrated at FIG. 13, where $p_F$ and $p_M$ are shown and, during the slew of SDL, the orientation O of SDL is not aligned with either Flora or Merryweather. The endpoint of the transition is illustrated at FIG. 14, where SDL has established an orientation O largely coincident with $p_F$.

Figure 16:
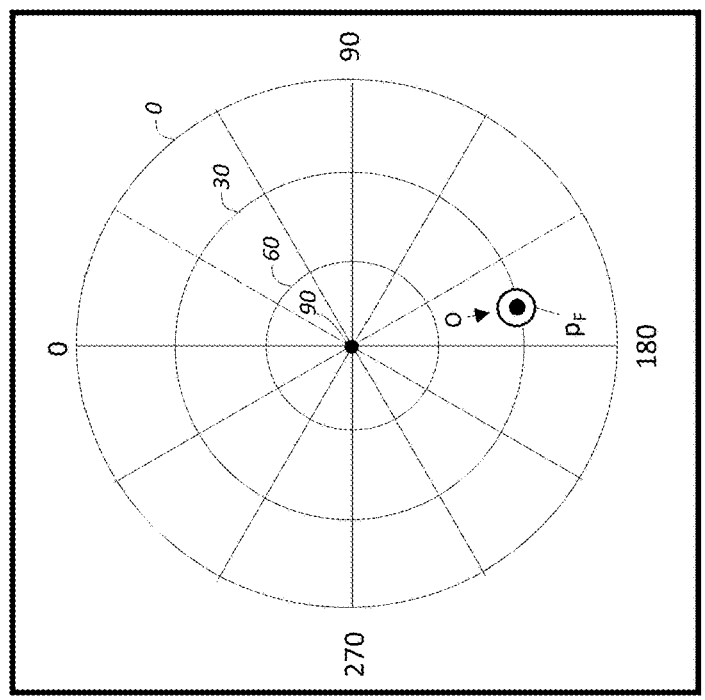
FIG. 16 illustrates a Cartesian polar plot at the final point in the additional scenario.
Figure 15:
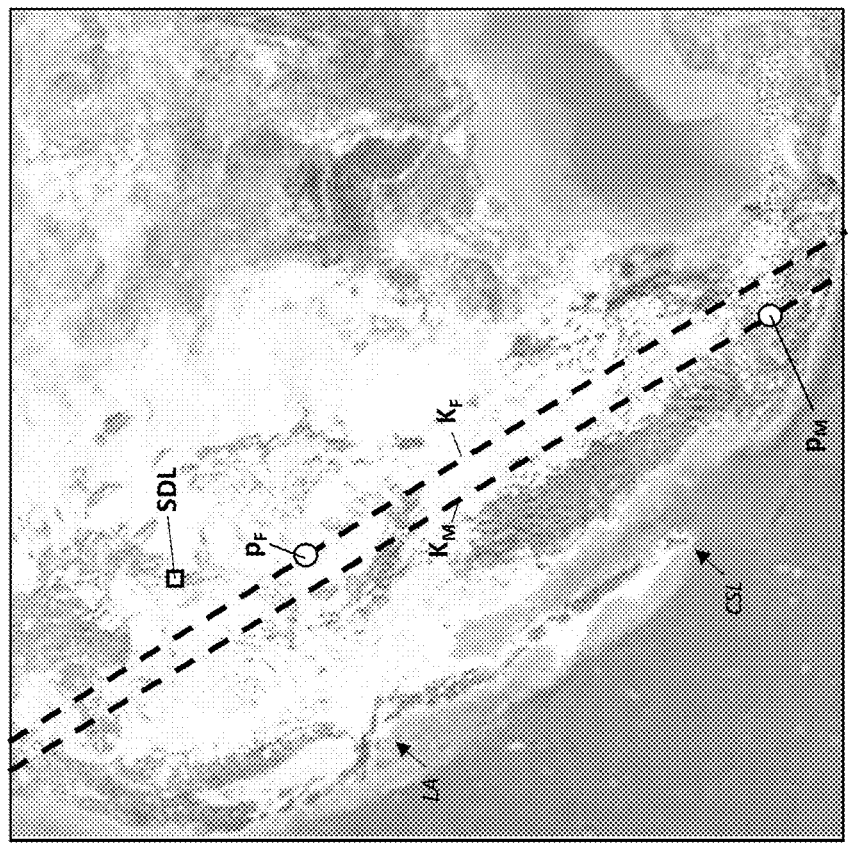
FIG. 15 illustrates the two satellites passing the ground station at a final point in the additional scenario.

FIG. 15 illustrates the scenario end, with Flora at position $p_F$ on path $K_F$ and Merryweather at position $p_M$ on path $K_M$ and below the local horizon of SDL. For reference, CSL generally indicates Cabo San Lucas, BS-MX. FIG. 16 illustrates the Cartesian azimuth/elevation polar plot and indicates SDL continuing to track Flora, as indicated by the orientation O of the aperture of SDL being largely coincident with $p_F$.

Figure 17:
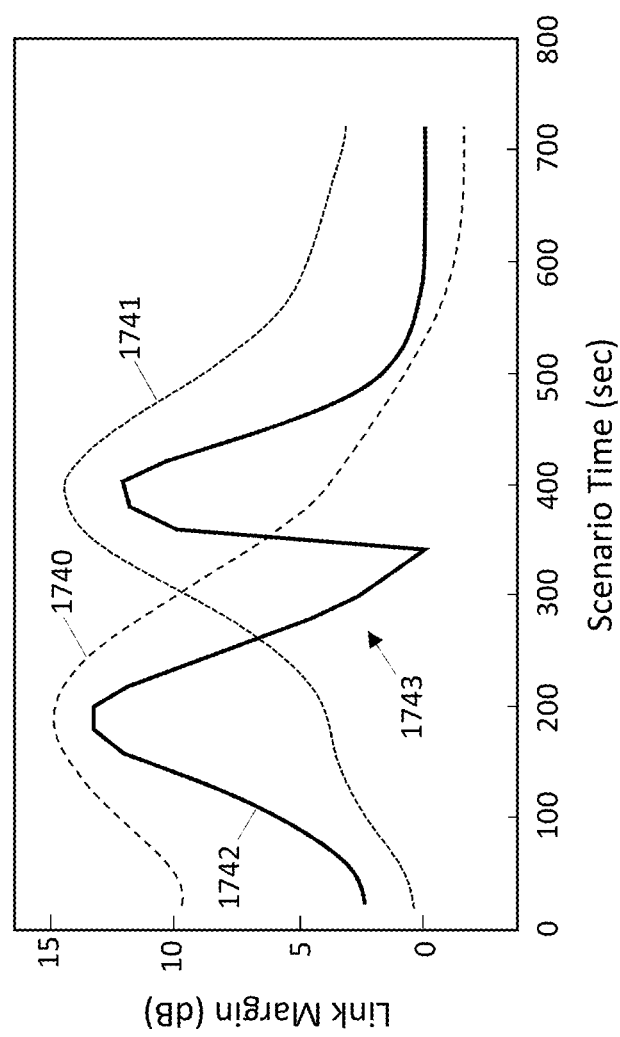
FIG. 17 illustrates a system-wide benefit achieved in the additional scenario.

The above scenario illustrates a simple example to validate the algorithm. The optimal solution for the one ground station, two satellite scenario is somewhat intuitive; to maximize benefit a station should track a satellite until it becomes more advantageous to switch to the other. FIG. 17 provides additional insight, showing the calculated link margin for Merryweather as 1740 and for Flora as 1741 over the scenario. The optimizer of digital processor 120 partitions the scenario into nodes that correspond to real time, such as time marks $t_k$, and this scenario used 36 nodes for a 12-minute event. The total benefit evaluated for the system is superimposed as 1742. With all other weighting factors kept equal (e.g., no weighting scalars applied to individual $v_{ij}(t_k)$), the overall benefit is maximized when the antenna tracks the peak signal strength from each satellite. The benefit dip in the middle of the scenario and indicated generally by 1743 corresponds to limited or no benefit being accrued in the transition between satellites. It is advantageous to minimize this transition time as much as possible.

Figure 18:
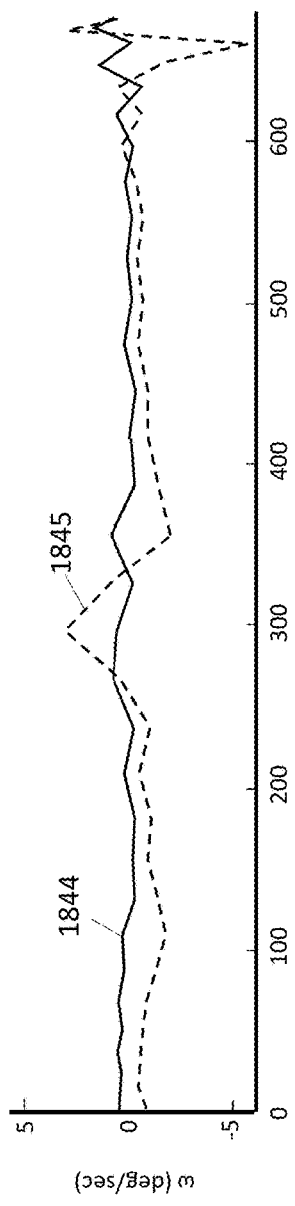
FIG. 18 illustrates angular rates executed by the ground station in the additional scenario.
Figure 19:
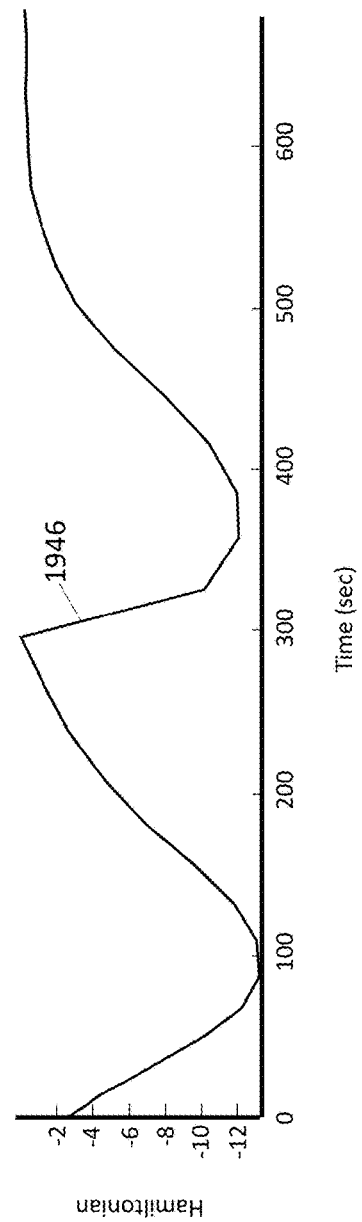
FIG. 19 illustrates a Hamiltonian for the additional scenario.

An additional advantage of the optimization approach utilized by processor 120 is illustrated at FIG. 18, which provides the elevation (as 1844) and azimuthal (as 1845) angular rates of SDL over the scenario, and represents the 36 node points of FIG. 17 as seconds elapsed. For this scenario is was desired that the control vector $u_{SDL}(t)$ generated by processor 120 limit the angular rates ω to below 6 degrees/sec due to physical limitations of the SDL ground station. This limitation was provided as a constraint for the optimization. As illustrated by FIG. 18, the control vector $u_{SDL}(t)$ maintains angular rates within the established limits. Additional insight is provided by FIG. 19 illustrating Hamiltonian values for the scenario as 1946. The Hamiltonian values fluctuate indicating a time-dependence in the problem formulation, which reflects the $BVF_{ij}(t_k)$ variance as the satellites move along their track and either approach or recede from a ground station. The generally low values of the Hamiltonian represent an approximately optimal solution. Hamiltonians are known to those skilled in the art. See e.g. Sussman et al., "300 Years of Optimal Control: From The Brachystochrone to the Maximum Principle," *IEEE Control Systems* 17(3) (1997); see also M. Intriligator, *Mathematical Optimization and Economic Theory* (2002); among many others.

For a single ground station servicing multiple satellites in similar orbits, the above scenario may occur multiple times per day. Without automation, managing transitions between one satellite and another requires operator intervention and would not scale to situations with many satellites and ground stations.

Example 2: Two Satellites, Two Ground Stations

To compare the above, a second similar simulation was conducted but with the addition of a second ground station. This additional station is located at the Cosmiac facility in partnership with the University of New Mexico (UNM) in Albuquerque, N. Mex.-US. The model, associated value weights, and problem scaling remain the same. Additionally, there is no constraint requiring that only one ground station service one satellite at a time. This allows antennas at both sites to simultaneously point at a single satellite if the benefit is maximized. Though only one station at a time can transmit, both can passively receive and forward data to the operator.

Figure 21:
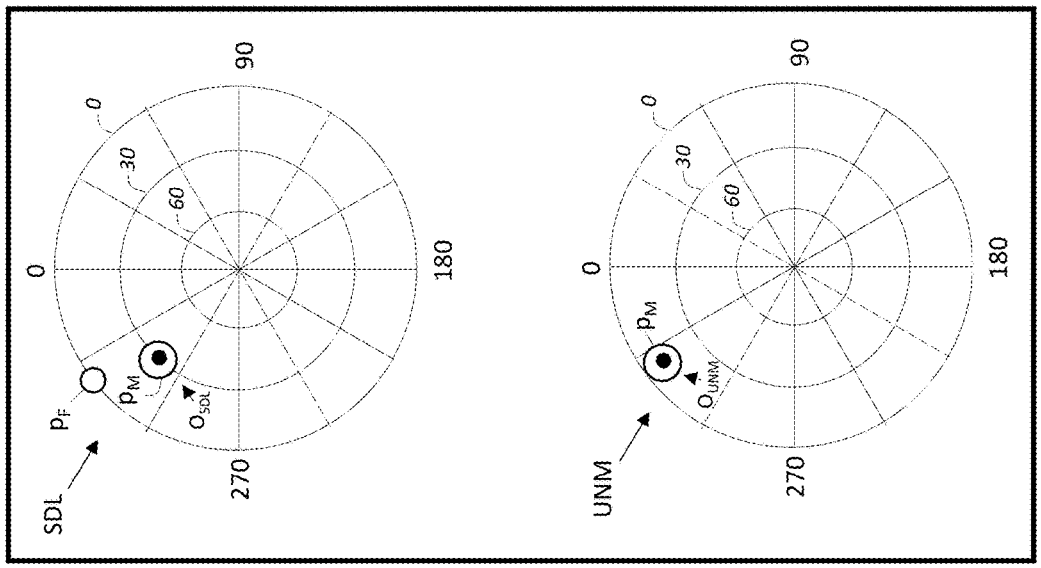
FIG. 21 illustrates Cartesian polar plots at the initial point in the further scenario.
Figure 20:
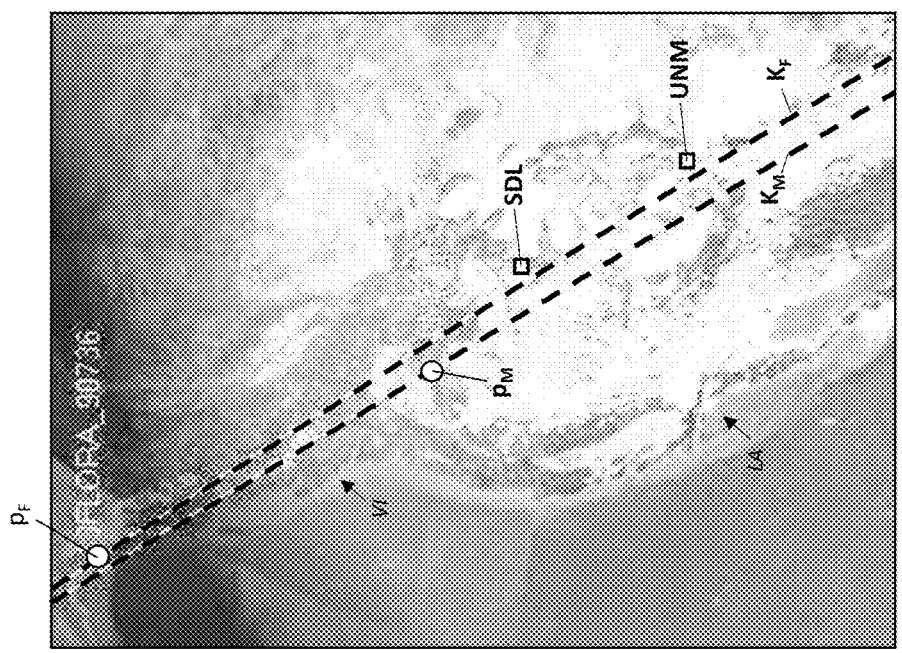
FIG. 20 illustrates two satellites passing a two ground stations at an initial point in a further scenario.

FIG. 20 illustrates the scenario start, with Flora at position $p_F$ on path $K_F$ and Merryweather at position $p_M$ on path $K_M$. Space Dynamics Laboratory Ground located at Logan, Utah-US is again indicated by SDL, with the Cosmiac facility in Albuquerque, N. Mex.-US indicated by UNM. Additional geographic reference is provided by the general indications LA and VI, as before. FIG. 21 illustrates the associated Cartesian azimuth/elevation polar plots for the two stations. At the start of the scenario, Merryweather ($p_M$) is in view for both SDL and UNM, but Flora ($p_F$) is on the horizon for SDL and out of view for UNM, as indicated by the respective plots. The control vectors $u_i(t)$ for the respective ground stations SDL and UNM both direct tracking Merryweather, as indicated by the orientations generally indicated as $O_{SDL}$ and $O_{UNM}$ being generally coincident with $p_M$ on each plot.

Figure 22:
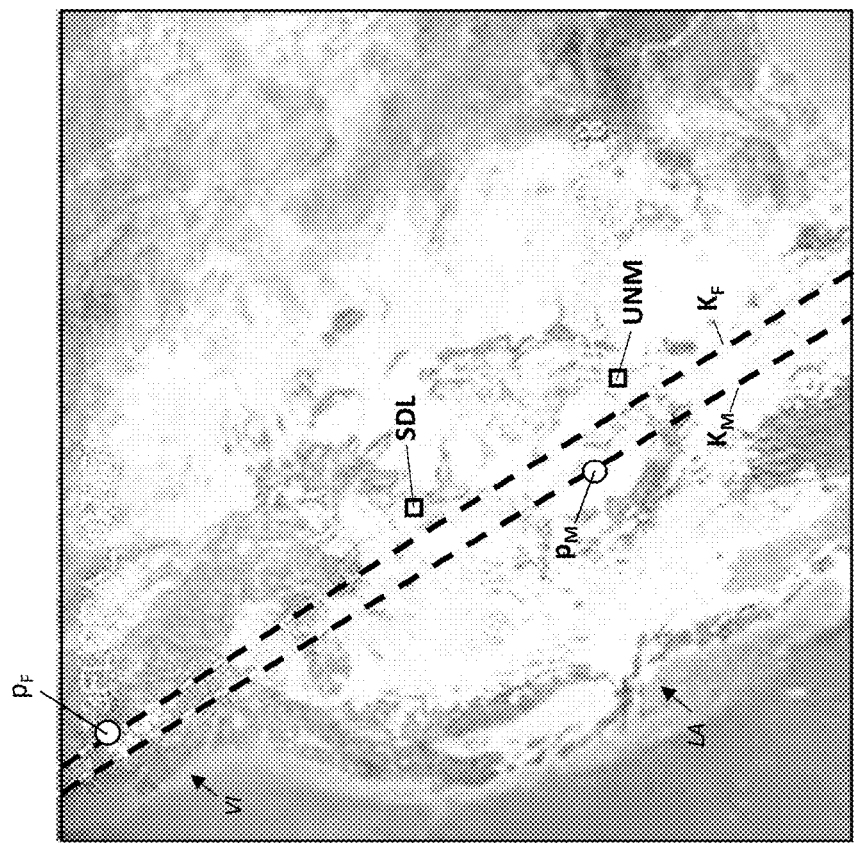
FIG. 22 illustrates two satellites passing a two ground stations at a mid-point of the further scenario.
Figure 24:
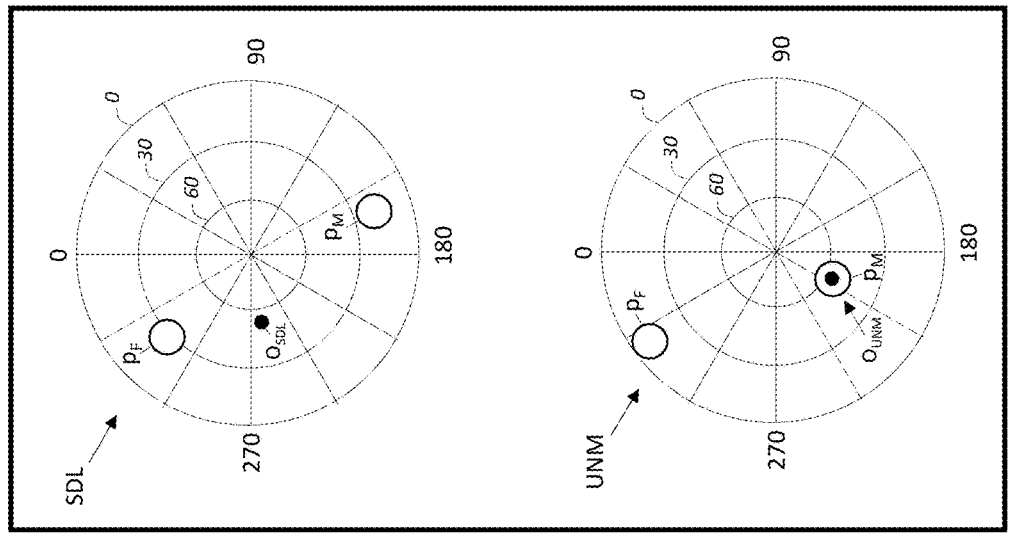
FIG. 24 illustrates Cartesian polar plots at a second point of the mid-point in the further scenario.
Figure 23:
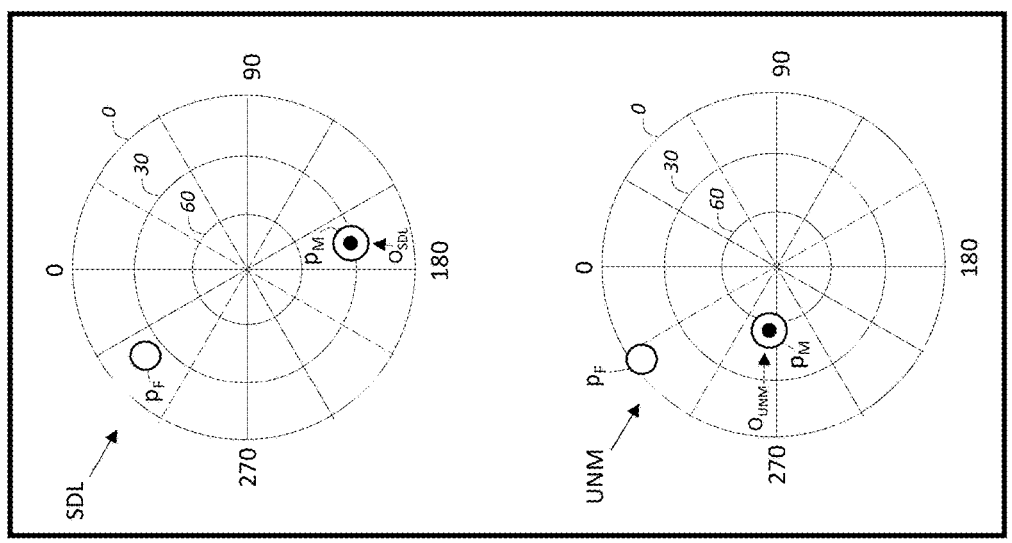
FIG. 23 illustrates Cartesian polar plots at a first point of the mid-point in the further scenario.

As the scenario continues, Merryweather flys past the SDL site and continues to approach UNM. FIG. 22 illustrates this portion of the scenario, with Flora at position $p_F$ on path $K_F$ and Merryweather at position $p_M$ on path $K_M$, and illustrating SDL, UNM, LA, and VI as before. Initially in this portion of the scenario, both SDL and UNM are still tracking Merryweather, as indicated by the Cartesian azimuth/elevation polar plots at FIG. 23, where the orientations $O_{SDL}$ and $O_{UNM}$ are both generally coincident with $p_M$. However once Merryweather passes SDL, as with the above single station example, the mission planning system recognizes that, with respect to SDL, the decreasing benefit of Merryweather is being surpassed by the increasing benefit from Flora, and the control vector $u_{SDL}(t)$ for SDL directs a transition from Merryweather to Flora. UNM continues tracking Merryweather as it continues to be most beneficial. This transition is illustrated at FIG. 24, where the orientation $O_{SDL}$ is slewing from $p_M$ to $p_F$ and not aligned with either Merryweather or Flora during the slew, while the orientation $O_{UNM}$ of UNM is generally coincident with $p_M$.

Figure 25:
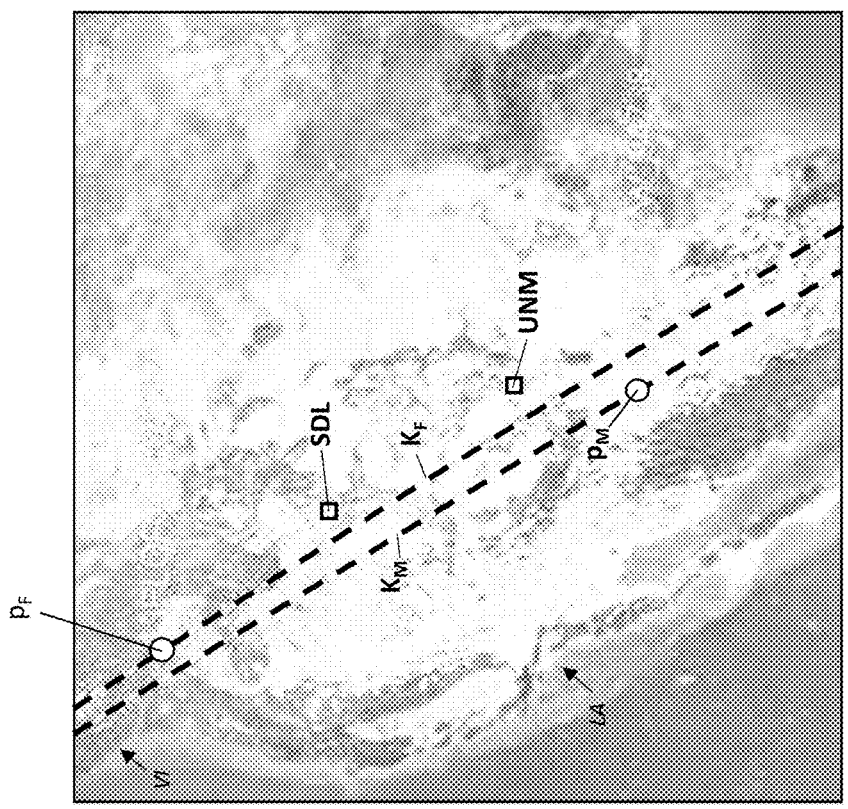
FIG. 25 illustrates two satellites passing a two ground stations at a final point of the further scenario.
Figure 27:
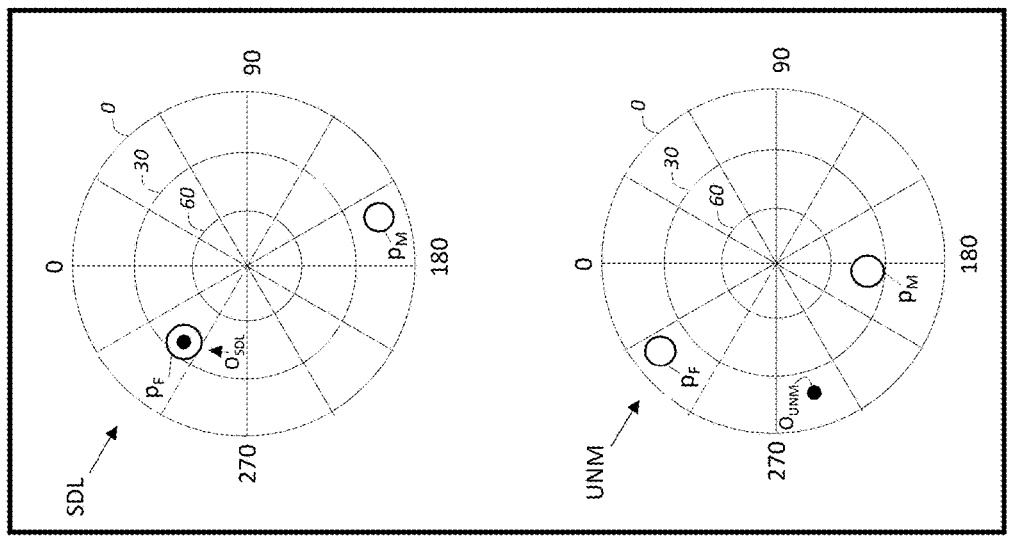
FIG. 27 illustrates Cartesian polar plots at a second point of the final point in the further scenario.
Figure 26:
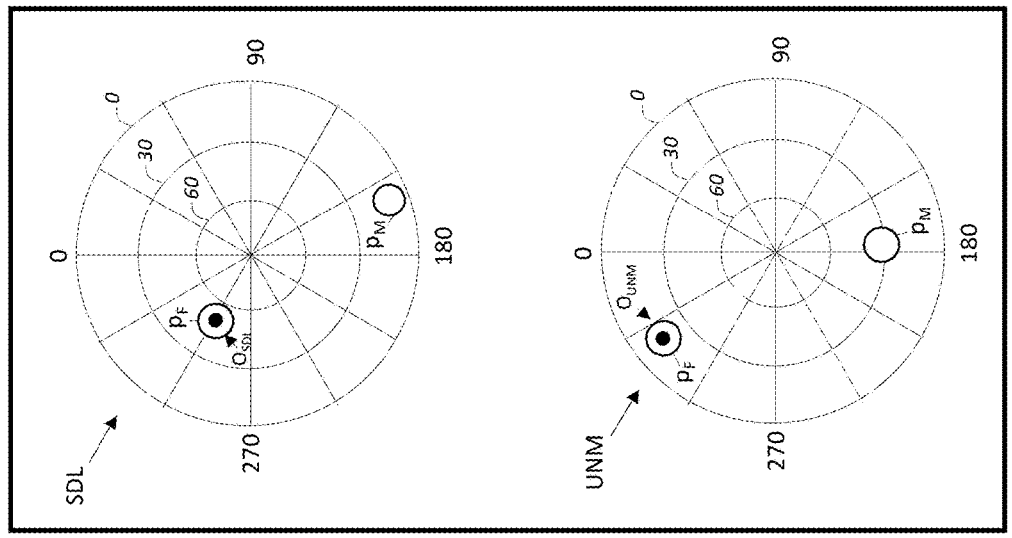
FIG. 26 illustrates Cartesian polar plots at a first point of the final point in the further scenario.

A point after SDL fully acquires the Flora target is illustrated at FIG. 25, with Flora at position $p_F$ on path $K_F$, Merryweather at position $p_M$ on path $K_M$, and illustrating SDL, UNM, LA, and VI as before. At this point, the mission planning system recognizes the decreasing benefit of maintaining UNM on Merryweather relative to Flora, and the control vector $u_{UNM}(t)$ for UNM begins the slew to acquire Flora as SDL maintains its track on Flora. This transition is illustrated at FIG. 26, where the orientation $O_{UNM}$ is slewing from $p_M$ to $p_F$ and not aligned with either Merryweather or Flora during the slew, while the orientation $O_{SDL}$ of SDL is generally coincident with $p_F$. The Flora satellite is tracked by both SDL and UNM until the end of the scenario, as indicated by FIG. 27 where both $O_{SDL}$ and $O_{UNM}$ are generally coincident with $p_F$. Processor 120 chooses the transition points which maximize the combined benefit from tracking the two satellites. In this scenario, only one transition occurred at a time, minimizing downtime.

Figure 28:
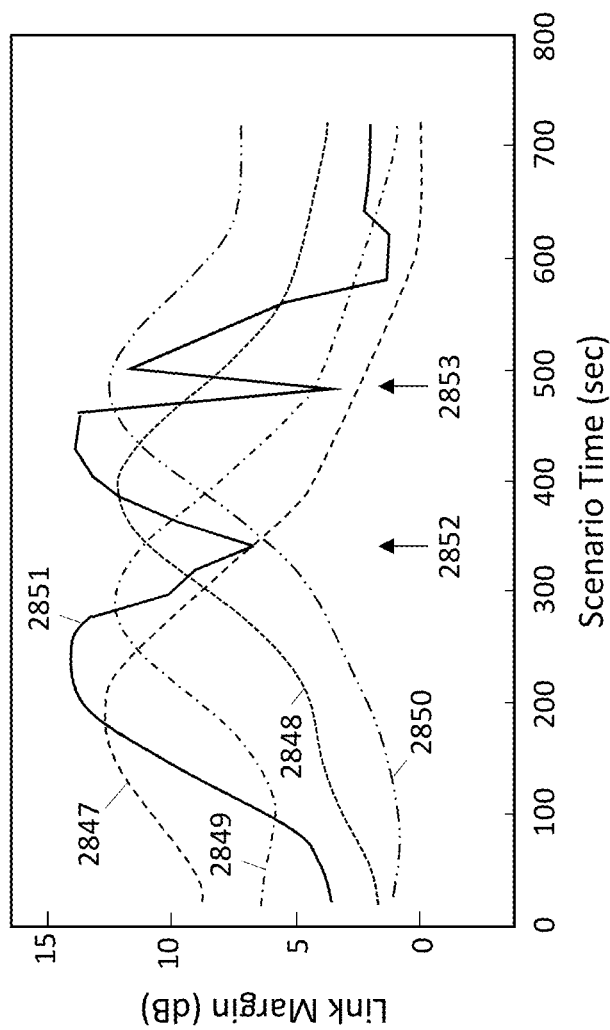
FIG. 28 illustrates a system-wide benefit achieved in the further scenario.

FIG. 28 illustrates calculated link margin for SDL and UNM over the scenario, with Merryweather and Flora relative to SDL as 2847 and 2848 respectively, and with Merryweather and Flora relative to UNM as 2849 and 2850 respectively. Similar to before, the optimizer of digital processor 120 partitions the scenario into nodes that corresponding to real time and the scenario used 36 nodes for a 12-minute event. The total benefit evaluated for the system is superimposed as 2851. The benefit dips indicated generally by 2852 and 2853 corresponds to the slews in the scenario conducted for SDL and UNM respectively.

Figure 29:
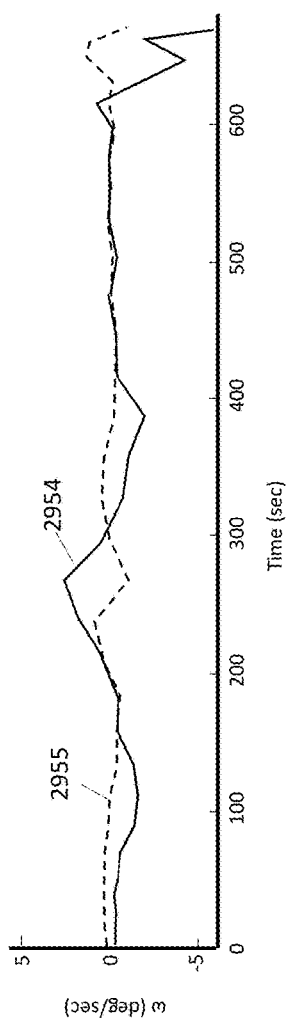
FIG. 29 illustrates angular rates executed by the first ground station in the further scenario.
Figure 30:
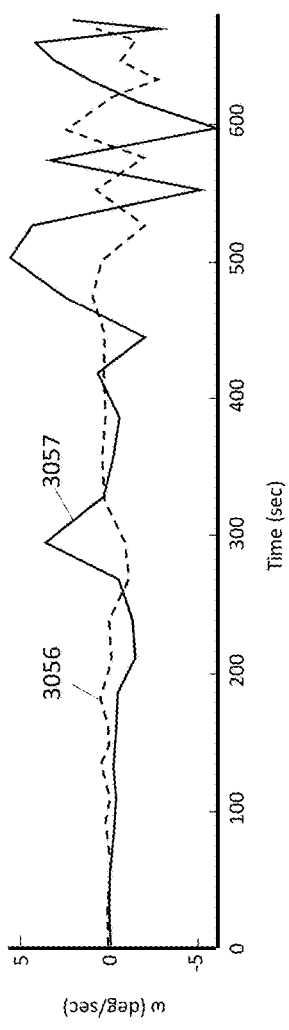
FIG. 30 illustrates angular rates executed by the second ground station in the further scenario.
Figure 31:
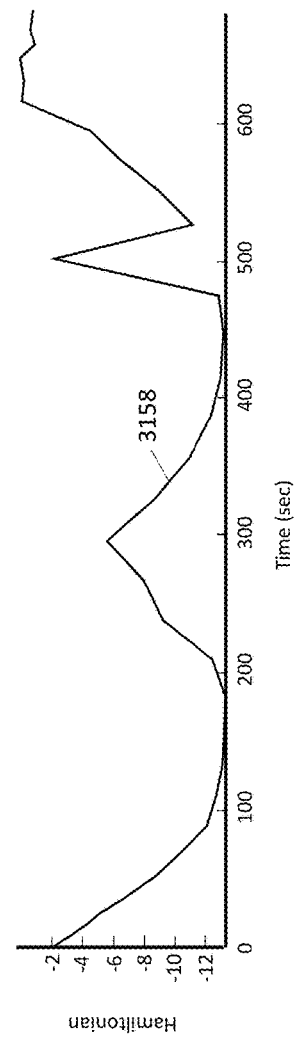
FIG. 31 illustrates a Hamiltonian for the further scenario.

FIG. 29 provides the elevation (as 2955) and azimuthal (as 2954) angular rates for SDL over the scenario, while FIG. 30 provides the elevation (as 3058) and azimuthal (as 3057) angular rates for UNM. As shown, the control vectors $u_{SDL}(t)$ and $u_{UNM}(t)$ generated by processor 120 limited the angular rates ω to below 6 degrees/sec, based on constraints provided for the optimization. FIG. 31 illustrates Hamiltonian values for the scenario as 3158.

Additional information related to the disclosure and specific examples follows.

Link Strength Analysis:

Remotely operated spacecraft typically employ the use of radio frequency (RF) communications for C2, telemetry, tracking and control (TT&C), and payload operations. A TT&C system is composed of transmitters and receivers located on the spacecraft and ground station. The transmitter antenna radiates an electromagnetic wave into free space, and the receiver antenna collects the fraction of energy which falls on it. Designing an RF communications architecture requires characterization of many complex interactions; many of which are difficult to predict. Therefore, communications systems carry additional design margin to account for uncertainties such as pointing losses, atmospheric attenuation, and realistic inefficiencies in cables, connectors, and antennas.

The end goal is to generate a signal strong enough to overcome these losses such that the quantity of RF energy at the receiver is at or above the minimum requirement for the radio, called link margin. The minimum required signal strength of the receiver is given in proportion to the surrounding noise of the environment which is a function of factors such as other transmitters, system temperature, and even cosmic noise. The ratio of the received signal strength to the surrounding system noise is defined as the signal-to-noise ratio (SNR). The systematic analysis of a communications system to arrive at SNR estimates is called a link budget. The small size of CubeSats forces limited battery capacity and reduced solar panel sizes when compared to traditional larger spacecraft. This poses a particular challenge for communications systems where onboard transmission power must be restricted to allow other systems and payloads to continue operating. Establishing two-way communications with a CubeSat from the ground is often limited by the space-to-ground link given the low power transmission generated by the satellite and the high power transmitters employed on the ground. Typical embodiments of this disclosure optimize communications as a function of the space-to-ground link, as it is often the limiting factor for CubeSat communications.

The analytic link budget typically begins with the equivalent isotropic radiated power (EIRP) of an antenna, which is a function of transmit power, $P_{TX}$, antenna gain, $G_{TX}$, and cable/connector losses, LOUT. EIRP and transmitter power is typically quantified in dBW:

$$EIRP = P_{rx} + G_{rx} + L_{OUT}$$

The free space path loss (FSPL) is the loss in signal strength of an electromagnetic wave as a function of distance and frequency:

$$FSPL = 20\log_{10}\left(\frac{4\pi}{c}\right) + 20\log_{10}(freq) + 20\log_{10}(range)$$

When using frequency units in MHz range units in km, and speed of light constant $c=2.99(10^5)$ km/sec, the FSPL equation can be written as:

$$FSPL = 32.45 + 20\log_{10}(freq) + 20\log_{10}(range)$$

Carrier signal strength is a function of EIRP, receive antenna gain $G_{RX}$, FSPL, atmospheric losses $L_{ATM}$, receiver input losses $L_{IN}$, pointing losses $L_{POINTING}$, and polarization losses $L_{POLARIZATION}$.

$$C = EIRP + G_{RX} - FSPL - L_{ATM} - L_{IN} - L_{POINTING} - L_{POLARIZATION}$$

The carrier-to-noise received power ratio can be subsequently computed as a function of system noise temperature $T_s$, and the Boltzman constant $k=1.38064852(10^{23})m^2$ kg $s^{-2}$ $K^{-1}$ giving $$C/N_0 = c - 10\log_{10}(T_s) - 10\log_{10}(k)$$

As a digital signal is modulated, its carrier energy is spread in the frequency domain in proportion to the data rate in bits per second (bps) as governed by the Shannon-Hartley theorem. A common metric for assessing this behavior is the energy per bit of the system $E_b$. The energy per bit is then compared to system noise to produce a signal-to-noise ratio:

$$E_b/N_0 = C/N_0 - 10\log_{10}(\text{rate})$$

The difference between the actual and required SNR in the system's link margin M:

$$M = E_b/N_0 - E_b/N_{0\_\text{required}}$$

The link margin for any communications system depends on the modulation, encoding scheme, data rate, receiver sensitivity, and many other factors and is therefore system-specific. Likewise, depending on the fidelity of the analysis and complex real world interactions, the minimum value of M often carries substantial margin; a factor of two (3 dB) or more. If the link margin is significantly above the minimum required value, engineers will often increase the data rate to take advantage of extra capacity in the system. Likewise, a poor link margin necessitates a decrease in data rates to increase the energy-per-bit in the system. Each system has a particular tolerance for acceptable pointing losses that can be captured in the optimization algorithms. Optimal slews of these ground-based antennas when targeting a satellite fall within this tolerance.

Additionally, directional antennas used in satellite communications systems radiate or receive greater energy in a particular direction. The energy decreases as a function of angle from the center and is often characterized as a loss in dB. Two examples of directional antennas are parabolic dishes and Yagi antennas. Typically, the beamwidth for directional antennas is defined as the angle within which the edges of the main lobe are at half the power (3 dB) of the peak effective radiated power. To maximize signal strength, the antenna must generally be pointed within this tolerance when transmitting or receiving. Considerations governing operating within this beamwidth include antenna rotator position accuracy and satellite position knowledge. These parameters can be integrated into the optimization model. The scenarios presented here utilize both Yagi and parabolic dish antennas within the MC3 system. From a practical standpoint, receiving signals with the Yagi antennas is possible within ±5 degrees off center in each axis, while the dish antenna operates within ±3 degrees. The optimization model was tuned to operate within these bounds.

Target Model Development:

Developing models for optimal control not only requires the formulation of the system dynamics but also the path constraints and respective cost functions. The optimizers utilized in this disclosure generally possess smooth contours and continuous functions.

In a specific embodiment and as discussed, the target size $T_{ij}(t)$ defines targets using an exponential (Gaussian) function. The Gaussian center is defined by $(x_n, y_n)$ and its width in each axis can be tuned with the parameters $\sigma_x$ and $\sigma_y$, as:

$$h(x(t), y(t)) = e^{-\left(\frac{(x-x_n)^2}{2\sigma_x^2} + \frac{(y-y_n)^2}{2\sigma_y^2}\right)}$$

Figure 32:
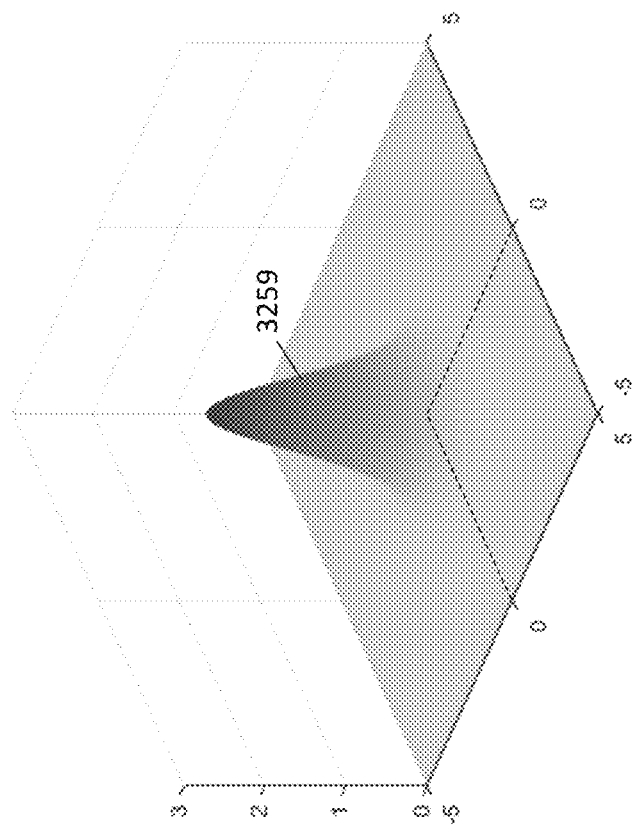
FIG. 32 illustrates an exemplary target function.

The Gaussian produces a continuous, differentiable curve to describe a target. An added benefit to this function is that the function approaches but never reaches zero, allowing the optimizer to follow the contour to the peak of the curve. An exemplary Gaussian 3259 is shown at FIG. 32. See e.g., Joseph Michael Greenslade, "An optimal control problem approach to mission planning problems: a proof of concept," (MS thesis, Naval Postgraduate School, 2014). Gaussians such as 3259 can be easily scaled to change the peak amplitude using, for example, a value function $v_{ij}(t)$.

In another embodiment, the target size $T_{ij}(t)$ utilizes the p-norm to create simple geometric shapes. Multiple p-norms can be used to create multiple targets or more complex shapes if desired. The general form of the center of the two-dimensional shape is defined by $(x_c, y_c)$, the width is defined by a and b, and the shape itself is defined by the value of p, as:

$$h(x(t), y(t)) = \left\|\left(\frac{x(t)-x_c}{a}\right)^p\right\| + \left\|\left(\frac{y(t)-y_c}{b}\right)^p\right\| - \|c^p\|$$

The value of p can go to ∞ though p=100 can be used for practical considerations. The absolute value can be eliminated by limiting the values of p to only even numbers, resulting in a continuous and differentiable function. See Lewis et al., "A pseudospectral method for real-time motion planning and obstacle avoidance," *AVT-SCI Joint Symposium on Platform Innovations and System Integration for Unmanned Air, Land and Sea Vehicles*, Florence, Italy, 14-17 May 2007; see also Bollino et al., "Optimal path planning and control of tactical unmanned aerial vehicles in urban environments," *Proceedings of the AUVSI's Unmanned Systems North America* 2007 *Conference*, Washington, D.C., August 2007; see also Lewis et al., "Pseudospectral motion planning techniques for autonomous obstacle avoidance," *Proceedings of the 46th IEEE Conference on Decision and Control*, New Orleans, La., 12-14 Dec. 2007; see also Michael A. Herni, "An information-centric approach to autonomous trajectory planning utilizing optimal control techniques," (PhD dissertation, Naval Postgraduate School, 2009); see also Greenslade, (MS thesis, Naval Postgraduate School, 2014).

Figure 33:
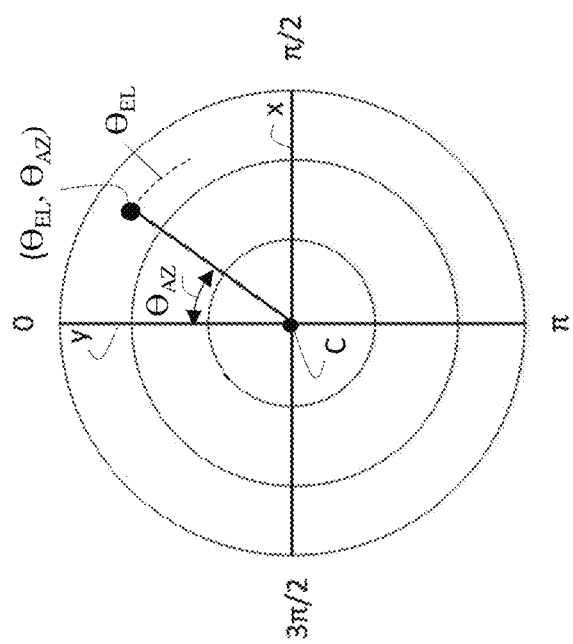
FIG. 33 illustrates an exemplary Cartesian polar plot.

Satellite-Ground Station Locations in Cartesian Space:

Generally, assessing the orientation of a ground station aperture with respect to a satellite position requires that both the aperture alignment and satellite position be transformed to a common coordinate frame. A variation of a unit circle structure can be used when describing and comparing various elevation $\Theta_{EL}$ and azimuth $\Theta_{AZ}$ angles describing object positions and vector orientations, as demonstrated at FIGS. 10, 12-14, 16, and others. In particular embodiments of this disclosure, elevation $\Theta_{EL}$ and azimuth $\Theta_{AZ}$ angles are referenced and compared on a unit circle having an origin defined by the location of the ground station as illustrated at FIG. 33. FIG. 33 illustrates a coordinate $(\Theta_{EL}, \Theta_{AZ})$ indicating a vector passing through a point C and having an elevation angle $\Theta_{EL}$ and azimuth angle $\Theta_{AZ}$. Elevation angles are delineated as indicated by 0, $\pi/2$, $\pi$, and $3\pi/2$ radians, and azimuth angles are delineated by concentric circles. The coordinate $(\Theta_{EL}, \Theta_{AZ})$ is located on the Cartesian grid by $\Theta_{EL}$ and $\Theta_{AZ}$ in the manner shown. In this embodiment, the orientation of an aperture of a ground station j may be evaluated relative to a position $p_i$ of a satellite i by comparing the elevation and azimuth of the slant range vector $\vec{r}_{ij}$ with the elevation and azimuth of a beam emanating from the aperture of the ground station j, as was conducted for FIGS. 10, 12-14, 16, and others.

The final expression converting azimuth and elevation angles into a normalized Cartesian grid is as follows:

$$(x, y) = \left( \frac{\frac{\pi}{2} - \theta_{EL}}{\frac{\pi}{2}} \sin(\theta_{AZ}), \frac{\frac{\pi}{2} - \theta_{EL}}{\frac{\pi}{2}} \cos(\theta_{AZ}) \right)$$

In another embodiment, alignment of a satellite i and ground station j may be evaluated using a dot product of a vector $\delta_{jSITE}$ expressing the direction of a beamwidth and a vector $\delta_{iSAT}$ expressing the direction of a slant range vector $\vec{r}_{ij}$, where both $\delta_{jSITE}$ and $\delta_{iSAT}$ intersect some point typically comprising or in the close proximity of the ground station j. The dot product $\delta_{jSITE} \cdot \delta_{iSAT}$ is maximized when the satellite range vector and antenna boresight are generally aligned.

Figure 34:
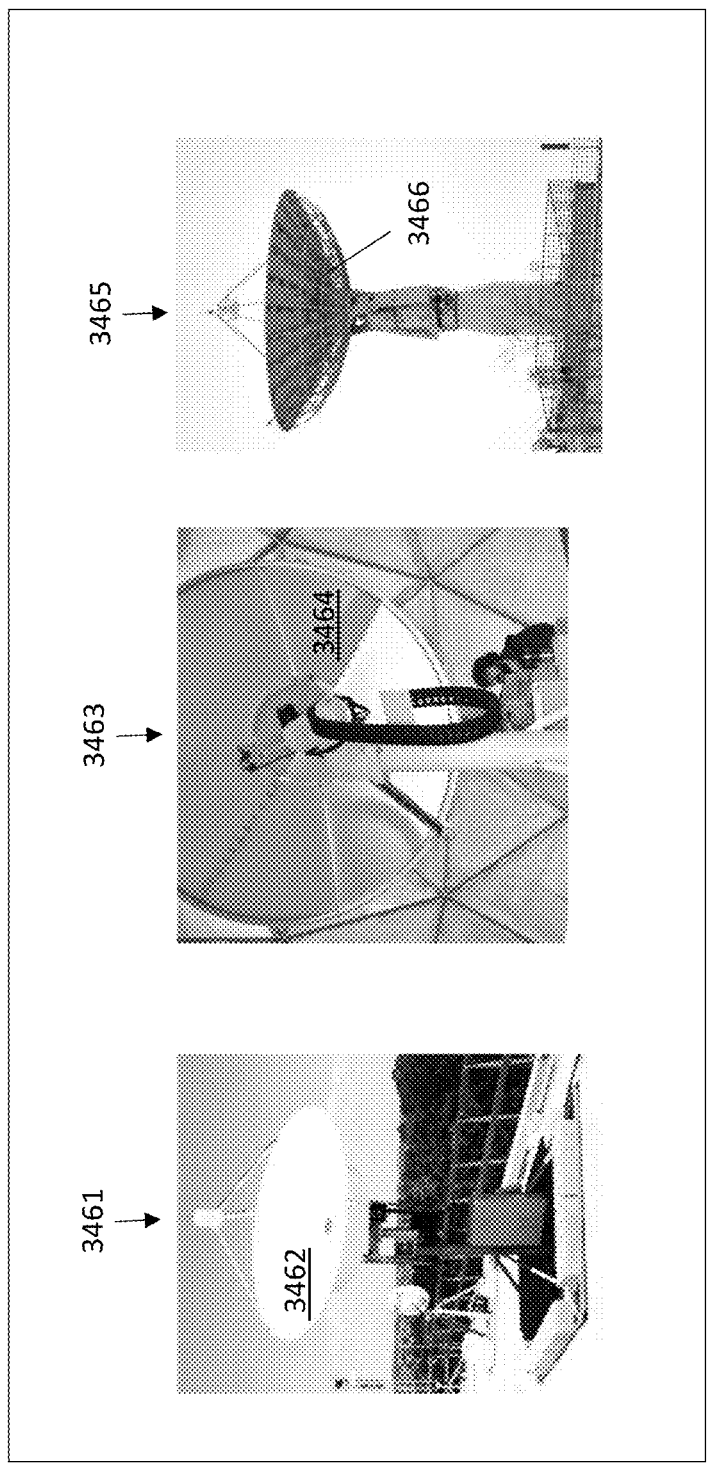
FIG. 34 illustrates exemplary ground stations.

Kinematics and Dynamics:

Ground-based sensors and tracking systems used for satellite communications and operations vary greatly depending on the application. The commonality between these systems is that there are at least two degrees of freedom required to position the ground-based sensor such that the satellite enters its field of view. FIG. 34 shows three exemplary ground stations 3461, 3463, and 3465 comprising satellite communications apertures 3462, 3464, and 3466 respectively, with different positioners employed for each one to achieve the same end result of satellite tracking. At FIG. 34, ground station 3461 is a 3-meter parabolic dish employing an azimuth/elevation rotor system. Ground station 3463 is a 3-meter dish using a modern X/Y rotator architecture to minimize keyhole effects. Ground station 3465 is a 10-meter dish using an azimuth/elevation positioning system with an addition tilting capability for keyhole mitigation. Regardless of the physical means of pointing the aperture, the satellite communications problem requires that pointing to a local azimuth and elevation be performed as shown in FIG. 2 and referenced elsewhere. In an embodiment, the mission planning system disclosed assumes the use of an azimuth and elevation positioner system which involves two large geared motors mounted orthogonally and whose azimuth axis of rotation is aligned with zenith.

A good approximation for a geared motor moving an antenna is the double integrator model commonly used in dynamic analyses. The basis for the double integrator is that the motor provides a torque $\tau$ into the system causing an angular acceleration about the axis of rotation. The acceleration can be integrated as a function of time twice to produce velocity and position values. Mathematically, the double integrator model for the azimuth and elevation positioners is as follows:

$$\tau_{AZsite} = J_{AZsite} \ddot{\theta}_{AZsite}$$

$$\tau_{ELsite} = J_{ELsite} \ddot{\theta}_{ELsite}$$

and rearranged as:

$$\ddot{\theta}_{AZsite} = \frac{\tau_{AZsite}}{J_{AZsite}}$$

$$\ddot{\theta}_{ELsite} = \frac{\tau_{ELsite}}{J_{ELsite}}$$

Where J is the rotational moment of inertia of the system and $\theta$ is the angular position of the system. In certain embodiments, the mission planning system considers motor torques as the control variables, providing:

$$\dot{\theta}_{AZsite} = \omega_{AZsite}$$

$$\dot{\theta}_{ELsite} = \omega_{ELsite}$$

$$\dot{\omega}_{AZsite} = \frac{\tau_{AZsite}}{J_{AZsite}}$$

$$\dot{\omega}_{ELsite} = \frac{\tau_{ELsite}}{J_{ELsite}}$$

Where $\omega$ is the angular velocity of each degree of freedom. The angles map directly to the traditional topographic reference frame commonly used in satellite observation applications. The system states are:

$$x(t) = [\theta_{AZsite} \theta_{ELsite} \omega_{AZsite} \omega_{ELsite}]$$

With the above states a function of the rotor angular velocity of each degree of freedom, the system's controls may be summarized as a function of motor torques only, as:

$$u(t) = [\tau_{AZ} \tau_{EL}]$$

Thus, provided here is a mission planning system for scheduling and executing the operations of one or more ground stations in order to optimize overall system communications with a plurality of satellites. The mission planning system comprises one or more ground stations and further comprises a digital processor in communication with each ground station. The digital processor acts to assess the benefits and penalties acting in the system as a whole over a given time horizon from an initial time $t_o$ to a final time $t_f$ as the plurality of satellites proceeds over expected paths. The system-wide cost function evaluated by the processor generally compares resultant SNR and slewing penalties for achievable communications between the one or more ground stations and the plurality of satellites over the desired time horizon, and provides a control vector $u_j(t)$ for each ground station describing a desired orientation of its aperture as a function of time. The digital processor determines these individual control vectors $u_j(t)$ through an optimization process, in order that various physical constraints and weighting factors pertinent to an individual ground station may be incorporated and accommodated.

Accordingly, this description provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A system for mission planning of ground station networks comprising:

one or more ground stations, where every individual ground station has a location, and where the every individual ground station comprises an aperture and further comprises a pointing system in mechanical communication with the aperture, and the pointing system establishing the aperture at a specific azimuth and a specific elevation in accordance with a control vector $u_j(t)$ provided to the every individual ground station; and a digital processor, where the digital processor is programmed to provide the control vector $u_j(t)$ to the every individual ground station by performing steps comprising:

receiving a time horizon where the time horizon defines an elapsed time from an initial time $t_0$ to a final time $t_f$;

receiving position data, where the position data establishes a position for every satellite comprising a plurality of satellites at one or more time periods comprising the time horizon;

establishing one or more time marks $t_k$, where each time mark $t_k$ is a time later than or equal to the initial time $t_0$ and earlier than or equal to the final time $t_f$;

determining a target size $T_{ij}(t_k)$ by evaluating a target size equation $T_{ij}(t)$ at the each time mark $t_k$, where an absolute value of the target size equation $T_{ij}(t)$ increases over at least an interval of a potential orientation $Oj(t_k)$ as a vector dot product of the potential orientation $Oj(t_k)$ and a unit vector of a slant range $r_{ij}(t_k)$ increases;

formulating a cost function, where the cost function comprises an addend $A_j(t_k)$ for each specific ground station j comprising the one or more ground stations at each time mark $t_k$, where the addend $A_j(t_k)$ comprises:

a Benefit Value Function for each particular satellite i comprising the plurality of satellites, where the Benefit Value Function comprises:

a value $v_{ij}(t_k)$ where the value $v_{ij}(t_k)$ is dependent on the slant range $r_{ij}(t_k)$ between the each specific ground station j and the each particular satellite i, where the slant range $r_{ij}(t_k)$ is based on the location of the each specific ground station j and a position $p_i(t_k)$ for the each particular satellite i at the each time mark $t_k$, where the position $p_i(t_k)$ is determined using the position data; and the target size $T_{ij}(t_k)$ where the target size $T_{ij}(t_k)$ is dependent on the potential orientation $Oj(t_k)$ over at least an interval of the potential orientation $Oj(t_k)$ and dependent on the position $p_i(t_k)$, where the potential orientation $Oj(t_k)$ defines an elevation angle and an azimuth angle of the aperture of the each specific ground station j at the each time mark $t_k$; and a slewing cost $G_{ij}(t_k)$, where the slewing cost $G_{ij}(t_k)$ is dependent on the potential orientation $Oj(t_k)$ over at least the interval of the potential orientation $Oj(t_k)$ and dependent on the direction of the slant range $r_{ij}(t_k)$, thereby formulating the cost function where the cost function comprises a plurality of potential orientations $Oj(t_k)$;

optimizing the cost function and quantifying each potential orientation $Oj(t_k)$ in the plurality of potential orientations $Oj(t_k)$, thereby generating a plurality of operational orientations $Oj(t_k)$; and providing the control vector $u_j(t)$ to the every individual ground station, where the control vector $u_j(t)$ provided to the every individual ground station defines at least one operational orientation $Oj(t_k)$ comprising the plurality of operational orientations $Oj(t_k)$.

2. The system of claim 1 where the digital processor is programmed to determine the slewing cost $G_{ij}(t_k)$ by evaluating a slewing cost equation $G_{ij}(t)$ at the each time mark $t_k$, where an absolute value of the slewing cost equation $G_{ij}(t)$ decreases over at least the interval of the potential orientation $Oj(t_k)$ as the vector dot product of the potential orientation $Oj(t_k)$ and the unit vector of the slant range $r_{ij}(t_k)$ increases.

3. The system of claim 2 where the digital processor is programmed to optimize the cost function by performing mathematical operations comprising:

$$\text{Minimize} J[x(\cdot), u(\cdot), t_f] = \int_{t_0}^{t_f} \sum_{i=0}^{n_{SAT}} \sum_{j=0}^{n_{SITE}} (v_{ij}(t)T_{ij}(t)) - G_{ij}(t)$$

where $n_{SAT}$ is the quantity of satellites comprising the plurality of satellites, $n_{SITE}$ is the quantity of ground stations comprising the one or more ground stations, $t_0$ is the initial time $t_0$, $t_f$ is the final time $t_f$, $T_{ij}(t)$ is the target size equation $T_{ij}(t)$, $G_{ij}(t)$ is the slewing cost equation $G_{ij}(t)$, and $v_{ij}(t_k)$ is a value equation $v_{ij}(t)$, where the value equation $v_{ij}(t)$ at the each time mark $t_k$ is dependent on the slant range $r_{ij}(t_k)$.

4. The system of claim 3 where the every individual ground station comprising the one or more ground stations is positioned on the Earth and where the every satellite comprising the plurality of satellites is in an orbit around the Earth.

5. The system of claim 1 where the each specific ground station j comprising the one or more ground stations has at least a maximum azimuth $\theta_{AZ\text{-}max}$, a minimum azimuth $\theta_{AZ\text{-}min}$, a maximum elevation $\theta_{EL\text{-}max}$, a minimum elevation $\theta_{EL\text{-}min}$, a maximum azimuthal rotation rate $\omega_{AZ\text{-}max}$ and a maximum elevation rotation rate $\omega_{EL\text{-}max}$, and where the digital processor is further programmed to optimize the cost function subject to the maximum azimuth $\theta_{AZ\text{-}max}$ of the each specific ground station j, the minimum azimuth $\theta_{AZ\text{-}min}$ of the each specific ground station j, the maximum elevation $\theta_{EL\text{-}max}$ of the each specific ground station j, the minimum elevation $\theta_{EL\text{-}min}$ of the each specific ground station j, the maximum azimuthal rotation rate $\omega_{AZ\text{-}max}$ of the each specific ground station j, and the maximum elevation rotation rate $\omega_{EL\text{-}max}$ of the each specific ground station j.

6. The system of claim 5 where the pointing system comprising the each specific ground station j provides at least a first degree-of-freedom and a second degree-of-freedom to the aperture comprising the each specific ground station j, and where the digital processor is programmed to formulate the cost function where the slewing cost $G_{ij}(t_k)$ comprises a first mechanical torque $\tau_{AZ}(t_k)$ in the first degree-of-freedom at the each time mark $t_k$ and comprises a second mechanical torque $\tau_{EL}(t_k)$ in the second degree-of-freedom at the each time mark $t_k$.

7. The system of claim 6 where the digital processor is programmed to formulate the cost function where the value $v_{ij}(t_k)$ comprises a free space path loss over the slant range $r_{ij}(t_k)$ between the each specific ground station j and the each particular satellite i.

8. The system of claim 7 where the where target size $T_{ij}(t_k)$ is dependent the potential orientation $Oj(t_k)$ referenced to a particular coordinate frame and dependent on the position $p_i(t_k)$ referenced to the particular coordinate frame, and where the digital processor is programmed to determine the target size $T_{ij}(t_k)$ by evaluating:

$$e^{-\left(\frac{(X_{SAT}-X_{SITE})^2}{2\sigma_x^2}+\frac{(Y_{SAT}-Y_{SITE})^2}{2\sigma_y^2}\right)}$$

where $X_{SAT}$ and $Y_{SAT}$ comprise the position $p_i(t_k)$ referenced to the particular coordinate frame, and where $X_{SITE}$ and $Y_{SITE}$ comprise the potential orientation $Oj(t_k)$ referenced to the particular coordinate frame, and where $\sigma_x$ is a dimension in a first axis of the particular coordinate frame and $\sigma_y$ is a dimension in a second axis of the particular coordinate frame.

9. A method for providing control vectors to a ground station network comprising:
receiving information on one or more ground stations, where every individual ground station has a location, and where the every ground station comprises an aperture and further comprises a pointing system in mechanical communication with the aperture, where the pointing system establishes the aperture at a specific azimuth and a specific elevation in accordance with a control vector $u_j(t)$ provided to the every ground station;
receiving a time horizon, where the time horizon comprises an initial time $t_0$ and a final time $t_f$;
receiving position data, where the position data establishes a position for every satellite comprising a plurality of satellites at one or more time periods comprising the time horizon;
establishing one or more time marks $t_k$, where each time mark $t_k$ is a time later than or equal to the initial time $t_0$ and earlier than or equal to the final time $t_f$;
formulating a cost function, where the cost function comprises an addend $A_j(t_k)$ for each specific ground station j comprising the one or more ground stations at each time mark $t_k$, where the addend $A_j(t_k)$ comprises:
a Benefit Value Function for each particular satellite i comprising the plurality of satellites, where the Benefit Value Function comprises:
a value $v_{ij}(t_k)$ where the value $v_{ij}(t_k)$ is dependent on a slant range $r_{ij}(t_k)$ between the each specific ground station j and the each particular satellite i, where the slant range $r_{ij}(t_k)$ is based on the location of the each specific ground station j and a position $p_i(t_k)$ for the each particular satellite i at the each time mark $t_k$, where the position $p_i(t_k)$ is determined using the position data; and
a target size $T_{ij}(t_k)$ where the target size $T_{ij}(t_k)$ is dependent on a potential orientation $Oj(t_k)$ over at least an interval of the potential orientation $Oj(t_k)$ and dependent on the position $p_i(t_k)$, where the potential orientation $Oj(t_k)$ defines an elevation angle and an azimuth angle of the aperture of the each specific ground station j at the each time mark $t_k$; and
a slewing cost $G_{ij}(t_k)$, where the slewing cost $G_{ij}(t_k)$ is dependent on the potential orientation $Oj(t_k)$ over at least the interval of the potential orientation $Oj(t_k)$ and dependent on the direction of the slant range $r_{ij}(t_k)$, thereby formulating the cost function where the cost function comprises a plurality of potential orientations $Oj(t_k)$;
optimizing the cost function and quantifying each potential orientation $Oj(t_k)$ in the plurality of potential orientations $Oj(t_k)$, thereby generating a plurality of operational orientations $Oj(t_k)$;
providing the control vector $u_j(t)$ to the every individual ground station, where the control vector $u_j(t)$ provided to the every individual ground station defines at least one operational orientation $Oj(t_k)$ comprising the plurality of operational orientations $Oj(t_k)$, thereby providing control vectors to the ground station network;
operating the each specific ground station j in accordance with the control vector $u_j(t)$ at one or more of the one of the one or more time marks; and
exchanging communications between at least one ground station comprising the one or more ground stations and at least one satellite comprising the plurality of satellites.

10. A non-transitory recording medium storing instructions executable by a digital processor for performing the method of claim 9.

11. The method of claim 9 further comprising:
determining the target size $T_{ij}(t_k)$ by evaluating a target size equation $T_{ij}(t)$ at the each time mark $t_k$, where an absolute value of the target size equation $T_{ij}(t)$ increases over at least an interval of the potential orientation $Oj(t_k)$ as a vector dot product of the potential orientation $Oj(t_k)$ and a unit vector of the slant range $r_{ij}(t_k)$ increases; and
determining the slewing cost $G_{ij}(t_k)$ by evaluating a slewing cost equation $G_{ij}(t)$ at the each time mark $t_k$, where an absolute value of the slewing cost equation $G_{ij}(t)$ decreases over at least the interval of the potential orientation $Oj(t_k)$ as the vector dot product of the potential orientation $Oj(t_k)$ and the unit vector of the slant range $r_{ij}(t_k)$ increases.

12. The method of claim 11 where optimizing the cost function comprises mathematical operations comprising:

$$\text{Minimize} J[x(\cdot), u(\cdot), t_f] = \int_{t_0}^{t_f} \sum_{i=0}^{n_{SAT}} \sum_{j=0}^{n_{SITE}} (v_{ij}(t) T_{ij}(t)) - G_{ij}(t)$$

where $n_{SAT}$ is the quantity of satellites comprising the plurality of satellites, $n_{SITE}$ is the quantity of ground stations comprising the one or more ground stations, $t_o$ is the initial time $t_o$, $t_f$ is the final time $t_f$, $T_{ij}(t)$ is the target size equation $T_{ij}(t)$, $G_{ij}(t)$ is the slewing cost equation $G_{ij}(t)$, and $v_{ij}(t_k)$ is a value equation $v_{ij}(t)$, where the value equation $v_{ij}(t)$ at the each time mark $t_k$ is dependent on the slant range $r_{ij}(t_k)$.

13. The method of claim 9 further comprising:
identifying for the each specific ground station j comprising the one or more ground stations a maximum azimuth $\theta_{AZ\text{-}max}$, a minimum azimuth $\theta_{AZ\text{-}min}$, a maximum elevation $\theta_{EL\text{-}max}$, a minimum elevation $\theta_{EL\text{-}min}$, a maximum azimuthal rotation rate $\omega_{AZ\text{-}max}$ and a maximum elevation rotation rate $\omega_{EL\text{-}max}$; and
optimizing the cost function subject to the maximum azimuth $\theta_{AZ\text{-}max}$ of the each specific ground station j, the minimum azimuth $\theta_{AZ\text{-}min}$ of the each specific ground station j, the maximum elevation $\theta_{EL\text{-}max}$ of the each specific ground station j, the minimum elevation $\theta_{EL\text{-}min}$ of the each specific ground station j, the maximum azimuthal rotation rate $\omega_{AZ\text{-}max}$ of the each specific ground station j, and the maximum elevation rotation rate $\omega_{EL\text{-}max}$ of the each specific ground station j.

14. The method of claim 13 where the slewing cost $G_{ij}(t_k)$ comprises a first mechanical torque $\tau_{AZ}(t)$ in a first degree-of-freedom for the each specific ground station j and comprises a second mechanical torque $\tau_{EL}(t)$ in a second degree-of-freedom for the each specific ground station j, and further comprising identifying for the pointing system comprising the each specific ground station j the first degree-of-freedom and the second degree-of-freedom.

15. An apparatus for communicating with a plurality of satellites using one or more ground stations comprising:
the one or more ground stations, where every individual ground station has a location, and where the every individual ground station comprises an aperture and further comprises a pointing system in mechanical communication with the aperture, and the pointing system configured to establish the aperture at a specific azimuth and a specific elevation in accordance with a control vector $u_j(t)$; and
a digital processor in communication with each of the one or more ground stations, the digital processor comprising a memory and the memory storing instructions executable by the digital processor, the instructions comprising:
receiving a time horizon where the time horizon defines an elapsed time from an initial time $t_0$ to a final time $t_f$;
receiving position data, where the position data establishes a position for every satellite comprising the plurality of satellites at one or more time periods comprising the time horizon;
establishing one or more time marks $t_k$, where each time mark $t_k$ is a time later than or equal to the initial time $t_0$ and earlier than or equal to the final time $t_f$;
determining a target size $T_{ij}(t_k)$ by evaluating a target size equation $T_{ij}(t)$ at the each time mark $t_k$, where an absolute value of the target size equation $T_{ij}(t)$ increases over at least an interval of a potential orientation $Oj(t_k)$ as a vector dot product of the potential orientation $Oj(t_k)$ and a unit vector of a slant range $r_{ij}(t_k)$ increases;
determining a slewing cost $G_{ij}(t_k)$ by evaluating a slewing cost equation $G_{ij}(t)$ at the each time mark $t_k$, where an absolute value of the slewing cost equation $G_{ij}(t)$ decreases over at least the interval of the potential orientation $Oj(t_k)$ as the vector dot product of the potential orientation $Oj(t_k)$ and the unit vector of the slant range $r_{ij}(t_k)$ increases;
formulating a cost function, where the cost function comprises an addend $A_j(t_k)$ for each specific ground station j comprising the one or more ground stations at each time mark $t_k$, where the addend $A_j(t_k)$ comprises:
a Benefit Value Function for each particular satellite i comprising the plurality of satellites, where the Benefit Value Function comprises:
a value $v_{ij}(t_k)$ where the value $v_{ij}(t_k)$ is dependent on the slant range $r_{ij}(t_k)$ between the each specific ground station j and the each particular satellite i, where the slant range $r_{ij}(t_k)$ is based on the location of the each specific ground station j and a position $p_i(t_k)$ for the each particular satellite i at the each time mark $t_k$, where the position $p_i(t_k)$ is determined using the position data; and
the target size $T_{ij}(t_k)$ where the target size $T_{ij}(t_k)$ is dependent on the potential orientation $Oj(t_k)$ over at least an interval of the potential orientation $Oj(t_k)$ and dependent on the position $p_i(t_k)$, where the potential orientation $Oj(t_k)$ defines an elevation angle and an azimuth angle of the aperture of the each specific ground station j at the each time mark $t_k$; and
the slewing cost $G_{ij}(t_k)$, where the slewing cost $G_{ij}(t_k)$ is dependent on the potential orientation $Oj(t_k)$ over at least the interval of the potential orientation $Oj(t_k)$ and dependent on the direction of the slant range $r_{ij}(t_k)$, thereby formulating the cost function where the cost function comprises a plurality of potential orientations $Oj(t_k)$;
optimizing the cost function and quantifying each potential orientation $Oj(t_k)$ in the plurality of potential orientations $Oj(t_k)$, thereby generating a plurality of operational orientations $Oj(t_k)$; and
communicating the control vector $u_j(t)$ to the pointing system of the every individual ground station, where the control vector $u_j(t)$ provided to the pointing system of the every individual ground station defines at least one operational orientation $Oj(t_k)$ comprising the plurality of operational orientations $Oj(t_k)$.

16. The apparatus of claim 15 where the instructions executable by the digital processor further comprise optimizing the cost function by performing mathematical operations comprising:

$$\text{Minimize} J[x(\cdot), u(\cdot), t_f] = \int_{t_0}^{t_f} \sum_{i=0}^{n_{SAT}} \sum_{j=0}^{n_{SITE}} (v_{ij}(t) T_{ij}(t)) - G_{ij}(t)$$

where $n_{SAT}$ is the quantity of satellites comprising the plurality of satellites, $n_{SITE}$ is the quantity of ground stations comprising the one or more ground stations, $t_0$ is the initial time $t_0$, $t_f$ is the final time $t_f$, $T_{ij}(t)$ is the target size equation $T_{ij}(t)$, $G_{ij}(t)$ is the slewing cost equation $G_{ij}(t)$, and $v_{ij}(t_k)$ is a value equation $v_{ij}(t)$, where the value equation $v_{ij}(t)$ at the each time mark $t_k$ is dependent on the slant range $r_{ij}(t_k)$.

17. The apparatus of claim 15 where the aperture comprising the every individual ground station has a maximum azimuth $\theta_{AZ\text{-}max}$ limit for the aperture, a minimum azimuth $\theta_{AZ\text{-}min}$ limit for the aperture, a maximum elevation $\theta_{EL\text{-}max}$ limit for the aperture, a minimum elevation $\theta_{EL\text{-}min}$ limit for the aperture, a maximum azimuthal rotation rate $\omega_{AZ\text{-}max}$ limit for the aperture, and a maximum elevation rotation rate $\omega_{EL\text{-}max}$ limit for the aperture, and where the instructions executable by the digital processor further comprise:
receiving the maximum azimuth $\theta_{AZ\text{-}max}$ limit for the aperture, the minimum azimuth $\theta_{AZ\text{-}min}$ limit for the aperture, the maximum elevation $\theta_{EL\text{-}max}$ limit for the aperture, the minimum elevation $\theta_{EL\text{-}min}$ limit for the aperture, the maximum azimuthal rotation rate $\omega_{AZ\text{-}max}$ limit for the aperture, and the maximum elevation rotation rate $\omega_{EL\text{-}max}$ limit for the aperture; and
optimizing the cost function subject to the maximum azimuth $\theta_{AZ\text{-}max}$ limit for the aperture, the minimum azimuth $\theta_{AZ\text{-}min}$ limit for the aperture, the maximum elevation $\theta_{EL\text{-}max}$ limit for the aperture, the minimum elevation $\theta_{EL\text{-}min}$ limit for the aperture, the maximum azimuthal rotation rate $\omega_{AZ\text{-}max}$ limit for the aperture, and the maximum elevation rotation rate $\omega_{EL\text{-}max}$ limit for the aperture.

* * * * *